US012044985B2

(12) United States Patent
Sato

(10) Patent No.: US 12,044,985 B2
(45) Date of Patent: Jul. 23, 2024

(54) IMAGE FORMING APPARATUS CAPABLE OF FACILITATING TONER REPLENISHMENT TO TONER SUPPLY UNIT

(71) Applicant: Brother Kogyo Kabushiki Kaisha, Nagoya (JP)

(72) Inventor: Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/942,290

(22) Filed: Sep. 12, 2022

(65) Prior Publication Data

US 2023/0004104 A1 Jan. 5, 2023

Related U.S. Application Data

(63) Continuation of application No. 16/810,327, filed on Mar. 5, 2020, now Pat. No. 11,487,223, which is a (Continued)

(30) Foreign Application Priority Data

Feb. 2, 2016 (JP) ................................ 2016-017928

(51) Int. Cl.
*G03G 15/08* (2006.01)

(52) U.S. Cl.
CPC ..... *G03G 15/0891* (2013.01); *G03G 15/0879* (2013.01); *G03G 15/0886* (2013.01)

(58) Field of Classification Search
CPC ........... G03G 15/0891; G03G 15/0879; G03G 15/0886
See application file for complete search history.

(56) References Cited

U.S. PATENT DOCUMENTS 4,142,655 A 3/1979 Fantuzzo
4,367,954 A 1/1983 Ganz et al.
(Continued)

FOREIGN PATENT DOCUMENTS

CN 1427312 A 7/2003
CN 2681175 Y 2/2005
(Continued)

OTHER PUBLICATIONS

Nov. 19, 2019—(JP) Office Action—App 2016-017928.
(Continued)

*Primary Examiner* — Victor Verbitsky
(74) *Attorney, Agent, or Firm* — Banner & Witcoff, Ltd.

(57) ABSTRACT

An image forming apparatus includes a main casing, a developing roller, a connecting tube, and a toner container. The main casing includes a sheet supply tray. The developing roller is provided in the main casing. The connecting tube has one end portion and another end portion inside the main casing. The toner container is for accommodating toner. The one end portion of the connecting tube is connected to the toner container. The toner container has an inlet opening for replenishing toner. The toner container is pivotally movable between a first position and a second position about the connecting tube. A position of the inlet opening at the second position is higher than a position of the inlet opening at the first position.

22 Claims, 14 Drawing Sheets

Related U.S. Application Data continuation of application No. 16/048,543, filed on Jul. 30, 2018, now Pat. No. 10,599,069, which is a continuation of application No. 15/408,525, filed on Jan. 18, 2017, now Pat. No. 10,061,230.

(56) References Cited

U.S. PATENT DOCUMENTS

| | | | |
|---|---|---|---|
| 4,641,945 A | 2/1987 | Kesue et al. | |
| 5,329,340 A | 7/1994 | Fukuchi et al. | |
| 8,417,160 B2 | 4/2013 | Ishiguro et al. | |
| 9,176,425 B2 | 11/2015 | Takami et al. | |
| 2002/0009310 A1 | 1/2002 | Kabumoto et al. | |
| 2003/0118368 A1 | 6/2003 | Saito et al. | |
| 2005/0207797 A1* | 9/2005 | Fujita | G03G 15/0855 399/258 |
| 2007/0223947 A1 | 9/2007 | Ohkawa et al. | |
| 2008/0170889 A1 | 7/2008 | Eto et al. | |
| 2010/0272477 A1 | 10/2010 | Nishikawa | |
| 2011/0064482 A1 | 3/2011 | Ishiguro et al. | |
| 2014/0248061 A1 | 9/2014 | Takami et al. | |

FOREIGN PATENT DOCUMENTS

| | | | |
|---|---|---|---|
| CN | 101046657 A | | 10/2007 |
| CN | 101226363 A | | 7/2008 |
| CN | 102023522 A | | 4/2011 |
| CN | 104020653 A | | 9/2014 |
| JP | S59-188678 A | | 10/1984 |
| JP | S61-004960 U | | 1/1986 |
| JP | S61-085865 U | | 6/1986 |
| JP | 01222276 A | * | 9/1989 |
| JP | H01-222276 A | | 9/1989 |
| JP | H05-204244 A | | 8/1993 |
| JP | H10-055100 A | | 2/1998 |
| JP | 2003-084517 A | | 3/2003 |
| JP | 2003-312624 A | | 11/2003 |
| JP | 2006-154875 A | | 6/2006 |
| JP | 2012-071585 A | | 4/2012 |
| WO | 2021250983 A1 | | 12/2021 |

OTHER PUBLICATIONS

May 12, 2020—(JP) Notice of Reasons for Refusal—App 2016-017928, Eng Tran.

Jul. 1, 2020—(CN) First Office Action—App 201710058468.X.

Mar. 24, 2021—(CN) The Second Office Action—App 201710058468.X.

Feb. 24, 2022—(CN) The First Office Action—App 202010156129.7.

Aug. 9, 2022—(CN) The Second Office Action—App 202010156129.7.

* cited by examiner

IMAGE FORMING APPARATUS CAPABLE OF FACILITATING TONER REPLENISHMENT TO TONER SUPPLY UNIT

CROSS REFERENCE TO RELATED APPLICATION

This application is a continuation of U.S. patent application Ser. No. 16/810,327 filed Mar. 5, 2020, which is a continuation of U.S. patent application Ser. No. 16/048,543 filed Jul. 30, 2018, issued as U.S. Pat. No. 10,599,069 on Mar. 24, 2020, which is a continuation of U.S. patent application Ser. No. 15/408,525 filed Jan. 18, 2017, issued as U.S. Pat. No. 10,061,230 on Aug. 28, 2018, which claims priority from Japanese Patent Application No. 2016-017928 filed Feb. 2, 2016. The entire contents of the priority applications are incorporated herein by reference.

TECHNICAL FIELD

The present disclosure relates to an electrophotographic type image forming apparatus.

BACKGROUND

An ink jet type image forming apparatus having an ejection head for ejecting ink to form an image is known in the art.

According to one kind of the ink jet type image forming apparatus, an ink cartridge system is provided such that a cartridge can be replaced by a new cartridge to replenish ink to a main body of the apparatus. According to another kind of the ink jet type image forming apparatus as described in Japanese Patent Application Publication No. 2012-71585, a liquid supply system is provided in which a user replenishes ink to an ink tank provided at an outside of the image forming apparatus, and the ink replenished in the ink tank is sucked at negative pressure and is supplied to the main body of the image forming apparatus.

SUMMARY

In an electrophotographic type image forming apparatus, similar to the ink jet type image forming apparatus as described in the Japanese Patent Application Publication No. 2012-71585, a demand has been made to provide a toner container to which a user can replenish toner. The replenished toner in the toner container is supplied to a developing device.

It is therefore an object of the disclosure to provide an electrophotographic type image forming apparatus capable of facilitating toner replenishment to a toner supply unit.

In order to attain the above and other objects, according to one aspect, the disclosure provides an image forming apparatus including: a main casing, a developing roller, a connecting tube, and a toner container. The main casing includes a sheet supply tray. The developing roller is provided in the main casing. The connecting tube has one end portion and another end portion inside the main casing. The toner container is for accommodating toner. The one end portion of the connecting tube is connected to the toner container. The toner container has an inlet opening for replenishing toner. The toner container is pivotally movable between a first position and a second position about the connecting tube. A position of the inlet opening at the second position is higher than a position of the inlet opening at the first position.

BRIEF DESCRIPTION OF THE DRAWINGS

The particular features and advantages of the disclosure will become apparent from the following description taken in connection with the accompanying drawings, in which.

DETAILED DESCRIPTION

First Embodiment

Figure 1:
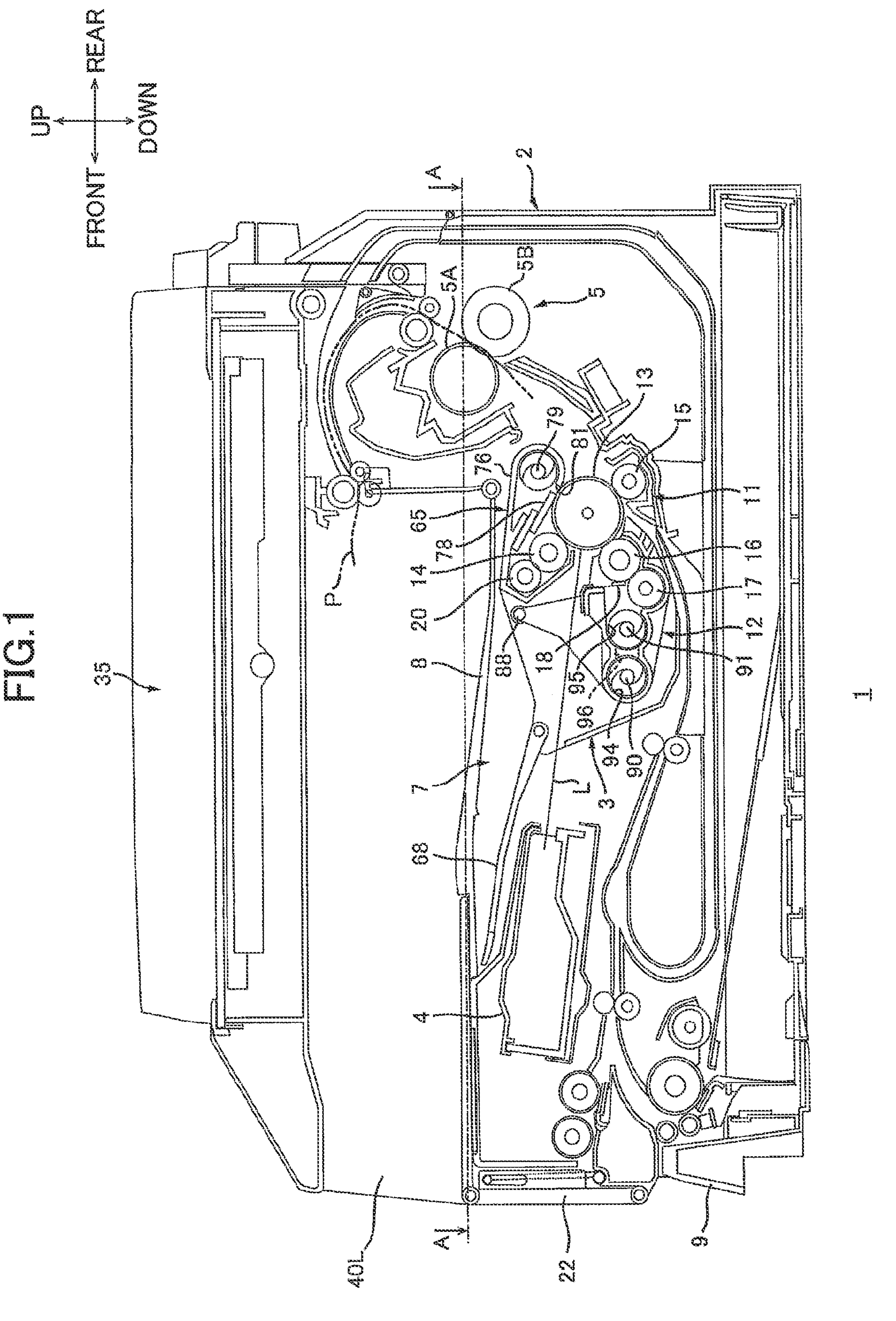
FIG. 1 is a central cross-sectional view of an image forming apparatus according to a first embodiment.

An image forming apparatus 1 according to a first embodiment will be described with reference to FIGS. 1 through 8. Throughout the description, the reference to "direction" is based on the directions as indicated by arrows in the drawings.

1. Outline of Image Forming Apparatus

Figure 2:
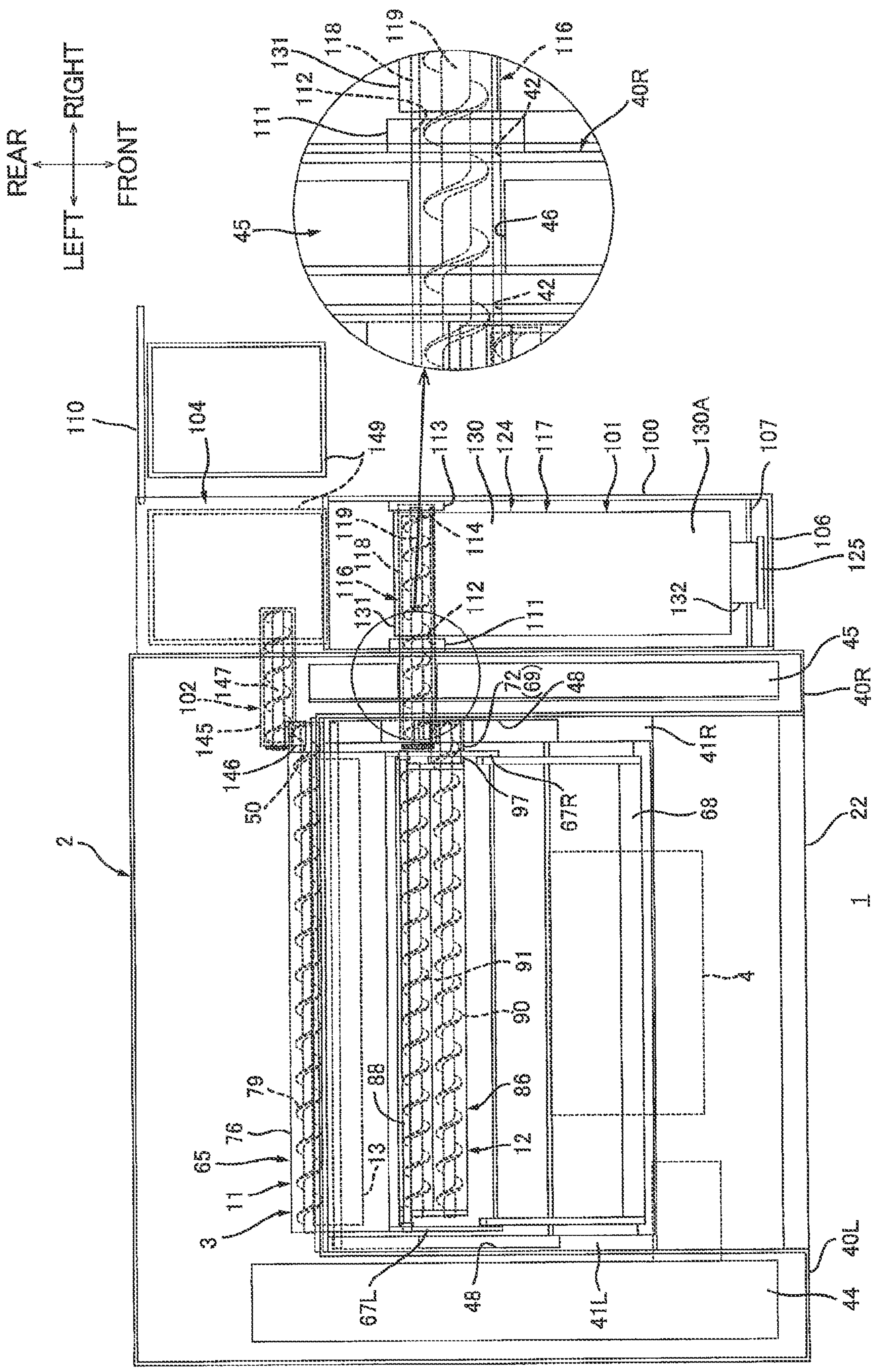
FIG. 2 is a cross-sectional view taken along a line A-A of FIG. 1.

As illustrated in FIGS. 1 and 2, the image forming apparatus 1 is a laser printer including a main casing 2 formed with an opening 7, a process cartridge 3, a toner supply unit 101, a scanner 4, a fixing unit 5, and a reading unit 35.

The main casing 2 is box-shaped and includes a cover 8, a sheet supply tray 9, and a manual insertion tray 22.

The opening 7 is positioned at an upper end portion of the main casing 2. That is, the main casing 2 has an upper wall through which the opening 7 extends vertically. The opening 7 allows the process cartridge 3 to pass therethrough.

The cover 8 is positioned at the upper end portion of the main casing 2, and extends in a frontward/rearward direction. The cover 8 is plate-like shaped, and is pivotally movable about a rear end portion thereof between a closed position (see FIG. 1) closing the opening 7 and an open position (see FIGS. 7 and 8) opening the opening 7. Sheets P discharged from the main casing 2 are loaded onto the cover 8.

The sheet supply tray 9 is positioned at a lower end portion of the main casing 2. The sheet supply tray 9 is adapted to accommodate the sheets P.

Figure 7:
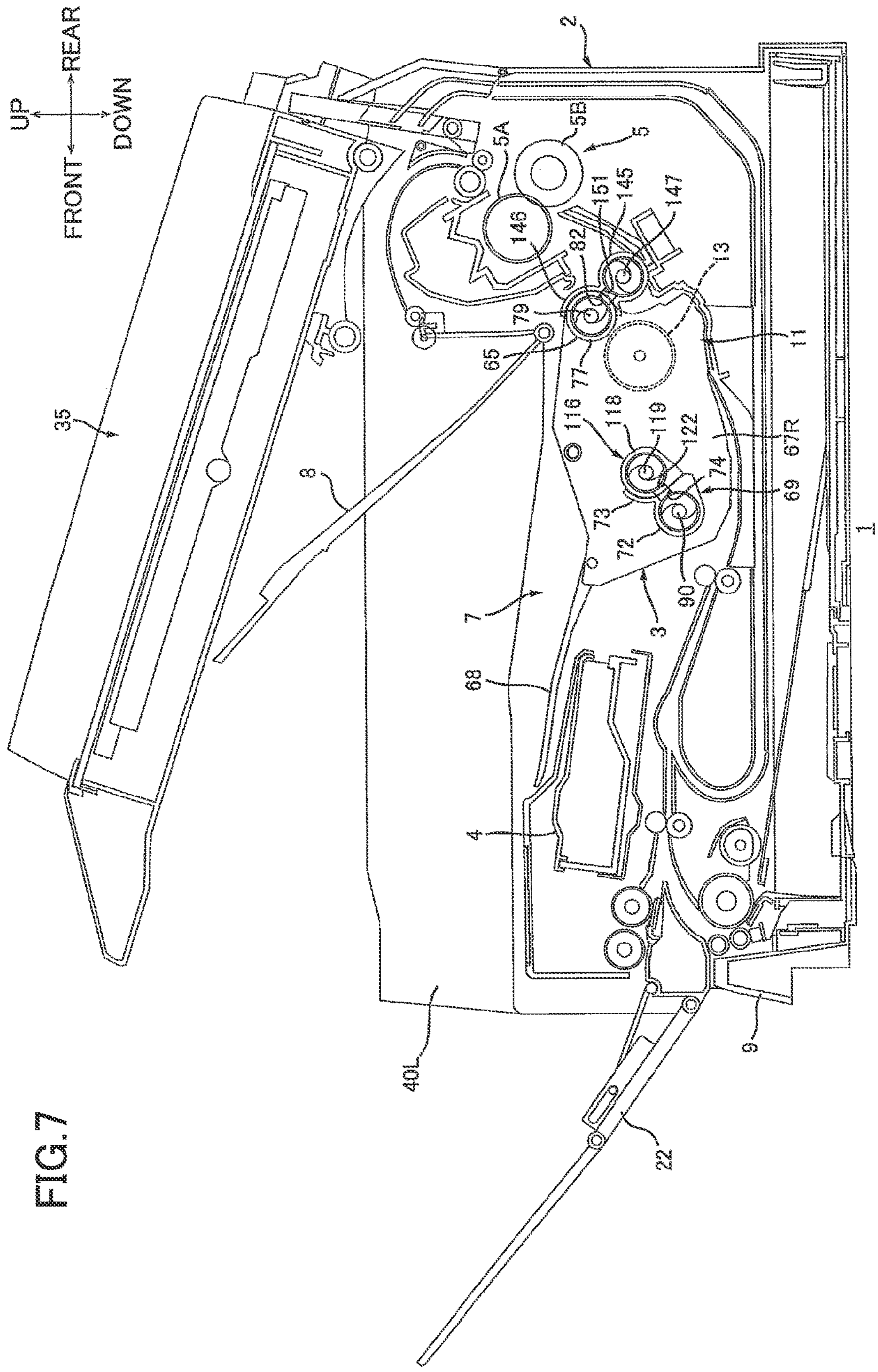
FIG. 7 is a cross-sectional view of the image forming apparatus illustrated in FIG. 1 and illustrating a connection between the process cartridge and the toner supply unit.

The manual insertion tray 22 is positioned at a front end portion of the main casing 2. The manual insertion tray 22 is adapted to support sheet(s) P mounted by a user. The sheet P supplied from the manual insertion tray 22 is conveyed to a portion between a photosensitive drum 13 and a transfer roller 15 through a conveying route different from that from the sheet supply tray 9. The manual insertion tray 22 is pivotally movable about a lower end portion thereof between a support position (see FIG. 7) and an accommodated position (see FIG. 1). The manual insertion tray 22 is foldable at its center portion. As illustrated in FIG. 7, the manual insertion tray 22 extends diagonally upward and frontward from the lower end portion at its support position, so that the sheet(s) P can be mounted on the manual insertion tray 22. As illustrated in FIG. 1, the manual insertion tray 22 is folded rearward so as to cover the upper wall of the main casing 2 when the manual insertion tray 22 is at the accommodated position. The manual insertion tray 22 also covers a front end portion of the cover 8 at its accommodated position.

Figure 8:
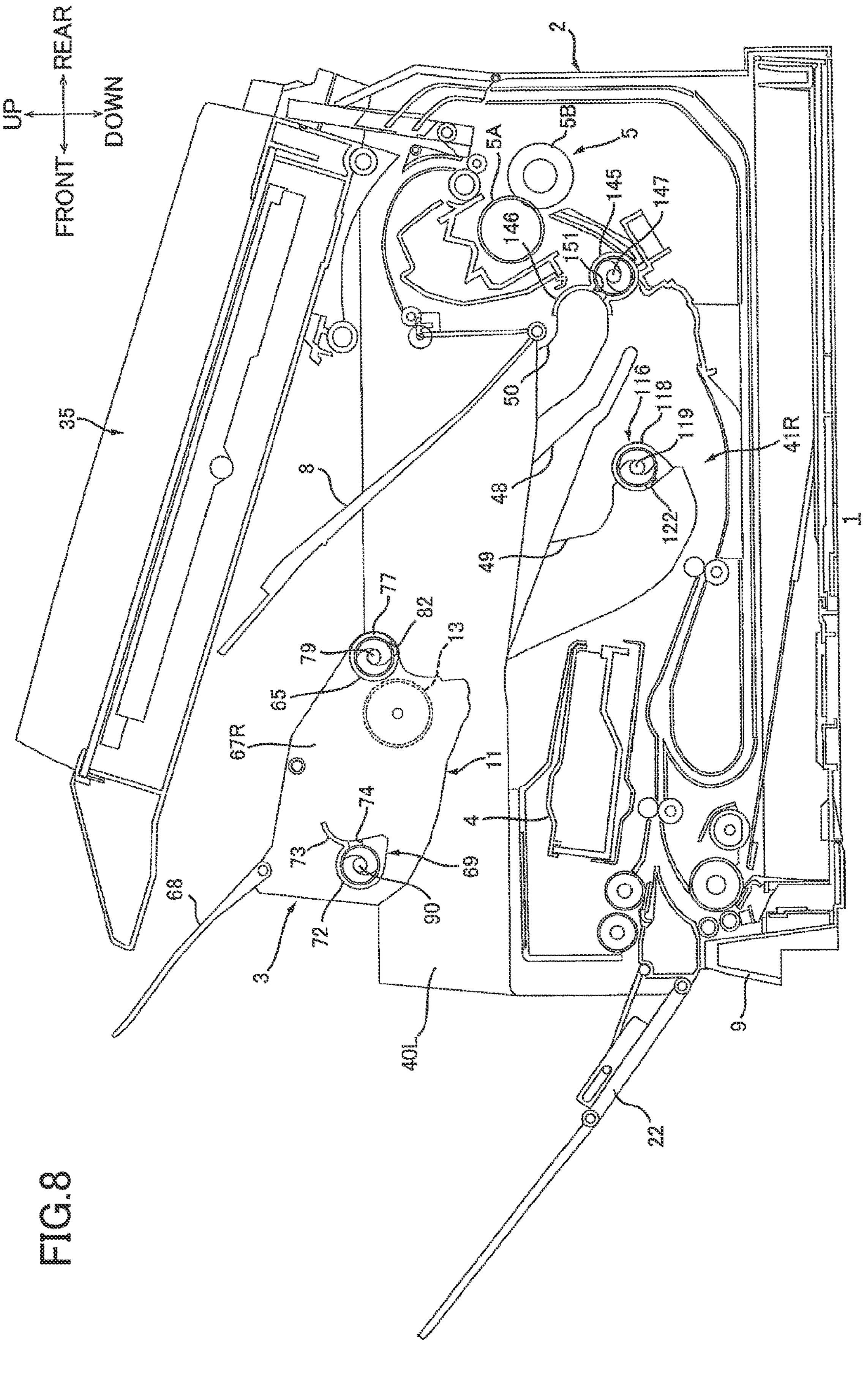
FIG. 8 is a view for description of attachment and detachment of the process cartridge with respect to the image forming apparatus illustrated in FIG. 7, and particularly illustrating grooves formed in an inner wall.

The process cartridge 3 is mounted to a central portion of the main casing 2. As illustrated in FIG. 8, the process cartridge 3 is attachable to and detachable from the main casing 2 through the opening 7. As illustrated in FIG. 1, the process cartridge 3 includes a drum unit 11 and a developing unit 12.

The drum unit 11 includes the photosensitive drum 13, a charge roller 14 adapted to charge a surface of the photosensitive drum 13, a charge cleaning roller 20 adapted to remove deposited material such as residual toner and paper dust on the surface of the charge roller 14, and the transfer roller 15 in contact with the photosensitive drum 13.

The photosensitive drum 13 is positioned at a rear end portion of the drum unit 11. The photosensitive drum 13 is cylindrical extending in a leftward/rightward direction.

The developing unit 12 is positioned frontward of the photosensitive drum 13, and includes a developing roller 16, a supply roller 17, and a blade 18.

The developing roller 16 is positioned at a rear end portion of the developing unit 12, and is in contact with the surface of the photosensitive drum 13. The developing roller 16 is adapted to supply toner to the photosensitive drum 13.

The supply roller 17 is positioned frontward of the developing roller 16 and is in contact with the developing roller 16. The supply roller 17 is adapted to supply toner to the developing roller 16.

The blade 18 is positioned frontward of the developing roller 16. A lower end portion of the blade 18 is positioned above the supply roller 17 so as to contact the developing roller 16. The blade 18 is adapted to regulate thickness of a toner layer formed on a surface of the developing roller 16.

As illustrated in FIG. 2, the toner supply unit 101 is positioned rightward of the process cartridge 3, and is not detachable from the main casing 2. The toner supply unit 101 is adapted to supply toner to the developing unit 12 of the process cartridge 3.

The scanner 4 is positioned frontward of the process cartridge 3. The scanner 4 is adapted to irradiate laser beam L based on image data toward the photosensitive drum 13 to expose the surface of the photosensitive drum 13 to light.

The fixing unit 5 is positioned rearward of the process cartridge 3, and includes a heat roller 5A and a pressure roller 5B in contact with the heat roller 5A.

The reading unit 35 is positioned above the cover 8 with a space therebetween. The reading unit 35 is a flat-bed type image scanner adapted to read image on an original document. The reading unit 35 is pivotally movable about a rear end portion thereof between a reading position (see FIG. 1) and a retracted position (see FIG. 7) retracted upward from the reading position.

2. Process Cartridge

(1) Drum Unit

Figure 3A:
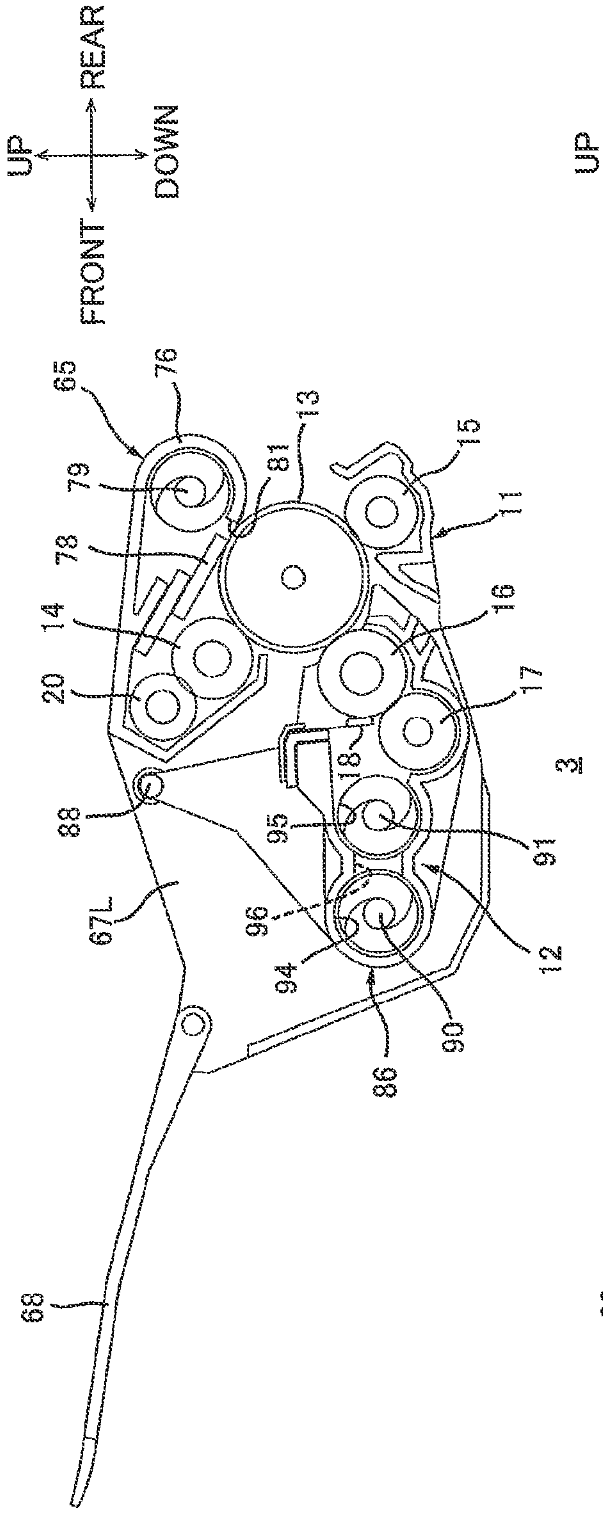
FIG. 3A is a central cross-sectional view of a process cartridge illustrated in FIG. 1.
Figure 3B:
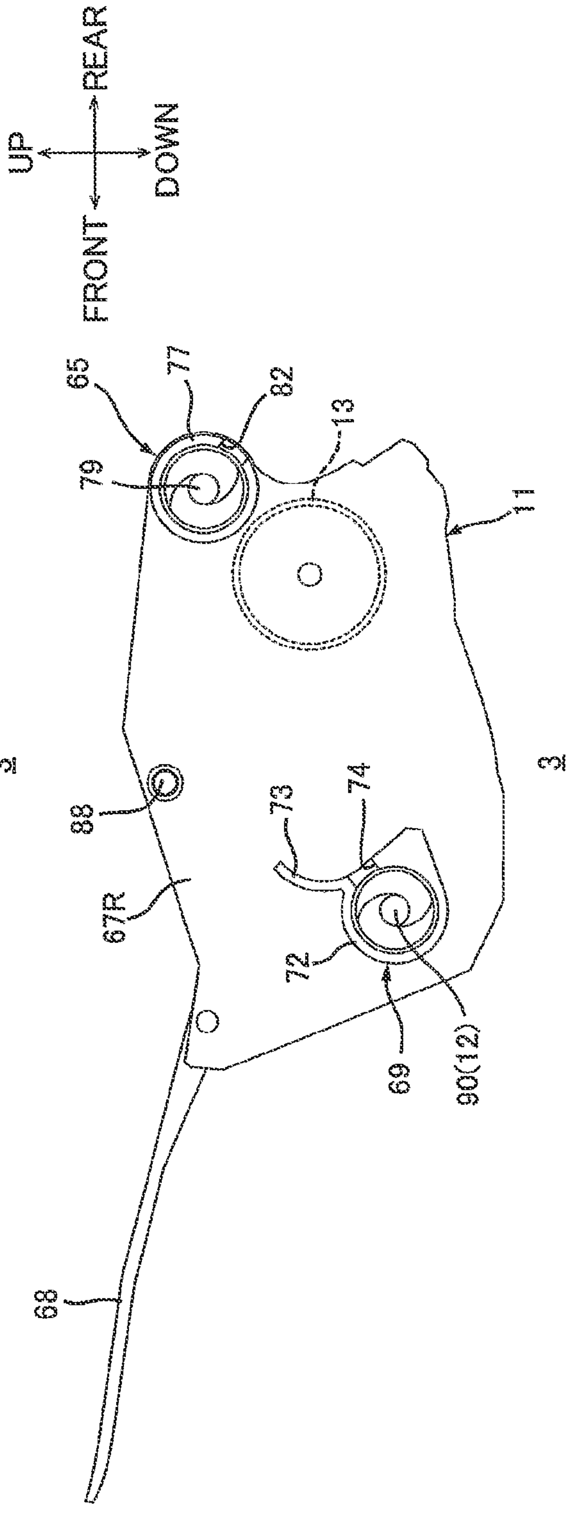
FIG. 3B is a cross-sectional view of the process cartridge illustrated in FIG. 3A taken along a plane positioned more rightward of the process cartridge in comparison with the cross-sectional view of FIG. 3A.

As illustrated in FIGS. 3A and 3B, the drum unit 11 includes a first side wall 671, a second side wall 67R, a handle 68, a connecting portion 69, a drum cleaning unit 65, and a protruding sleeve 77 formed with a hole 82.

The first and second side walls 67L and 67R are spaced away from each other in the leftward/rightward direction. The first and second side walls 67L, 67R are plate shaped extending in the frontward/rearward direction and an upward/downward direction.

The handle 68 is positioned at a front end portion of the drum unit 11. The handle 68 is pivotally movable relative to the first and second side walls 67L, 67R.

The connecting portion 69 is positioned at the front end portion of the drum unit 11, and includes a connection sleeve 72 formed with a hole 74, and an engagement portion 73.

The connection sleeve 72 protrudes rightward from a right surface of the second side wall 67R, and extends in the leftward/rightward direction. The connection sleeve 72 is generally cylindrical having a closed right end portion.

The hole 74 penetrates a rear end portion of the connection sleeve 72 in the frontward/rearward direction.

The engagement portion 73 extends upward from the connection sleeve 72 at a position above the hole 74. The engagement portion 73 is curved rearward toward its tip end such that the engagement portion 73 extends along an outer peripheral surface of a connecting tube body 118 of a connecting tube 116 described later and as illustrated in FIG. 7.

As illustrated in FIGS. 3A and 3B, the drum cleaning unit 65 includes a cleaning member 78, a waste toner accommodating portion 76 formed with an opening 81, and a screw 79.

The cleaning member 78 has a rear end portion in contact with an upper end portion of the peripheral surface of the photosensitive drum 13.

The waste toner accommodating portion 76 is a hollow tubular shaped extending in the leftward/rightward direction. Each end portion of the waste toner accommodating portion 76 in the leftward/rightward direction is closed. The left end portion and right end portion of the waste toner accommodating portion 76 are connected to the first side wall 67L, and the second side wall 67R, respectively.

The opening 81 is positioned at a bottom wall of the waste toner accommodating portion 76, and extends through a thickness of the bottom wall in the upward/downward direction.

The screw 79 is positioned in the waste toner accommodating portion 76. The screw 79 is in confrontation with the cleaning member 78 through the opening 81. The screw 79 is an auger screw extending in the leftward/rightward direction. The screw 79 has a left end portion rotatably supported to the first side wall 671, and a right end portion positioned rightward of the second side wall 67R. The right end portion of the screw 79 is rotatably supported to a right end portion of the protruding sleeve 77.

The protruding sleeve 77 protrudes rightward from the right surface of the second side wall 67R, and extends in the leftward/rightward direction. The protruding sleeve 77 extends through the second side wall 67R in the leftward/rightward, direction, and is generally hollow cylindrical having a closed right end portion.

The hole 82 extends through a rear end portion of the protruding sleeve 77 in the frontward/rearward direction.

(2) Developing Unit

As illustrated in FIG. 3A, the developing unit 12 includes a developing frame 86, a shaft 88, a first screw 90, and a second screw 91.

The developing frame 86 is generally box-shaped extending in the leftward/rightward direction. The developing frame 86 includes a conveying chamber 94 and a developing chamber 95.

The conveying chamber 94 is positioned at a front end portion of the developing frame 86, and extends through a right wall of the developing frame 86. As illustrated in FIGS. 3A and 3B, the conveying chamber 94 is aligned with the connection sleeve 72 of the connecting portion 69 in the leftward/rightward direction. The conveying chamber 94 is in communication with the connecting sleeve 72. A seal member 97 (see FIG. 2) is interposed between the conveying chamber 94 and the connecting sleeve 72, i.e., between the developing frame 86 and the second side wall 67R of the drum unit 11.

The seal member 97 is generally hollow cylindrical and is adapted to prevent toner from leaking from a portion between the conveying chamber 94 and the connecting sleeve 72, The seal member 97 is also adapted to connect the conveying chamber 94 and the connecting sleeve 72 to restrain toner leakage from the portion between the conveying chamber 94 and the connecting sleeve 72, even if the conveying chamber 94 is displaced from the connecting sleeve 72 as viewed in the leftward/rightward direction as a result of pivotal movement of the developing unit 12 relative to the drum unit 11.

The developing chamber 95 is positioned rearward of the conveying chamber 94. The developing chamber 95 is in communication with the conveying chamber 94 through a communication opening 96.

The developing frame 86 supports the developing roller 16, the supply roller 17, and the blade 18. The developing roller 16 has a rear end portion exposed to an outside through the developing frame 86.

The shaft 88 is positioned at an upper end portion of developing unit 12, and extends through the developing frame 86 in the leftward/rightward direction. The shaft 88 has a left end portion rotatably supported to the first side wall 67L of the drum unit 11, and has a right end portion rotatably supported to the second side wall 67R of the drum unit 11 as illustrated in FIG. 2.

With this structure, the developing unit 12 is pivotally movable about the shaft 88 relative to the drum unit 11.

As illustrated in FIGS. 3A and 3B, the first screw 90 is positioned in the conveying chamber 94 of the developing frame 86. The first screw 90 is an auger screw extending in the leftward/rightward direction. As illustrated in FIG. 2, the first screw 90 has a left end portion rotatably supported to a left wall of the developing frame 86, and has a right end portion protruding rightward through the right wall of the developing frame 86. That is, a distal right end of the first screw 90 is positioned rightward of the right wall of the developing frame 86. The right end portion of the first screw 90 extends through the second side wall 67R of the drum unit 11, and is positioned in the connecting sleeve 72 of the drum unit 11. The right end portion of the first screw 90 is rotatably supported to the right end portion of the connecting sleeve 72.

As illustrated in FIGS. 3A and 3B, the second screw 91 is positioned in the developing chamber 95 of the developing frame 86. The second screw 91 is an auger screw extending in the leftward/rightward direction. The second screw 91 has a left end portion rotatably supported to the left wall of the developing frame 86, and has a right end portion rotatably supported to the right wall of the developing frame 86.

3. Main Casing

As illustrated in FIGS. 2 and 8, the main casing 2 includes a first accommodation wall 40L, a second accommodation wall 40R formed with holes 42, a first inner wall 41L formed with a groove 48, and a second inner wall 41R formed with grooves 48, 49, and 50.

The first accommodation wall 40L constitutes a left wall of the main casing 2, and extends in the frontward/rearward direction and the upward/downward direction. The first accommodation wall 40L provides an internal space in which a driving portion 44 for inputting driving force to the photosensitive drum 13, etc. is accommodated.

Figure 4:
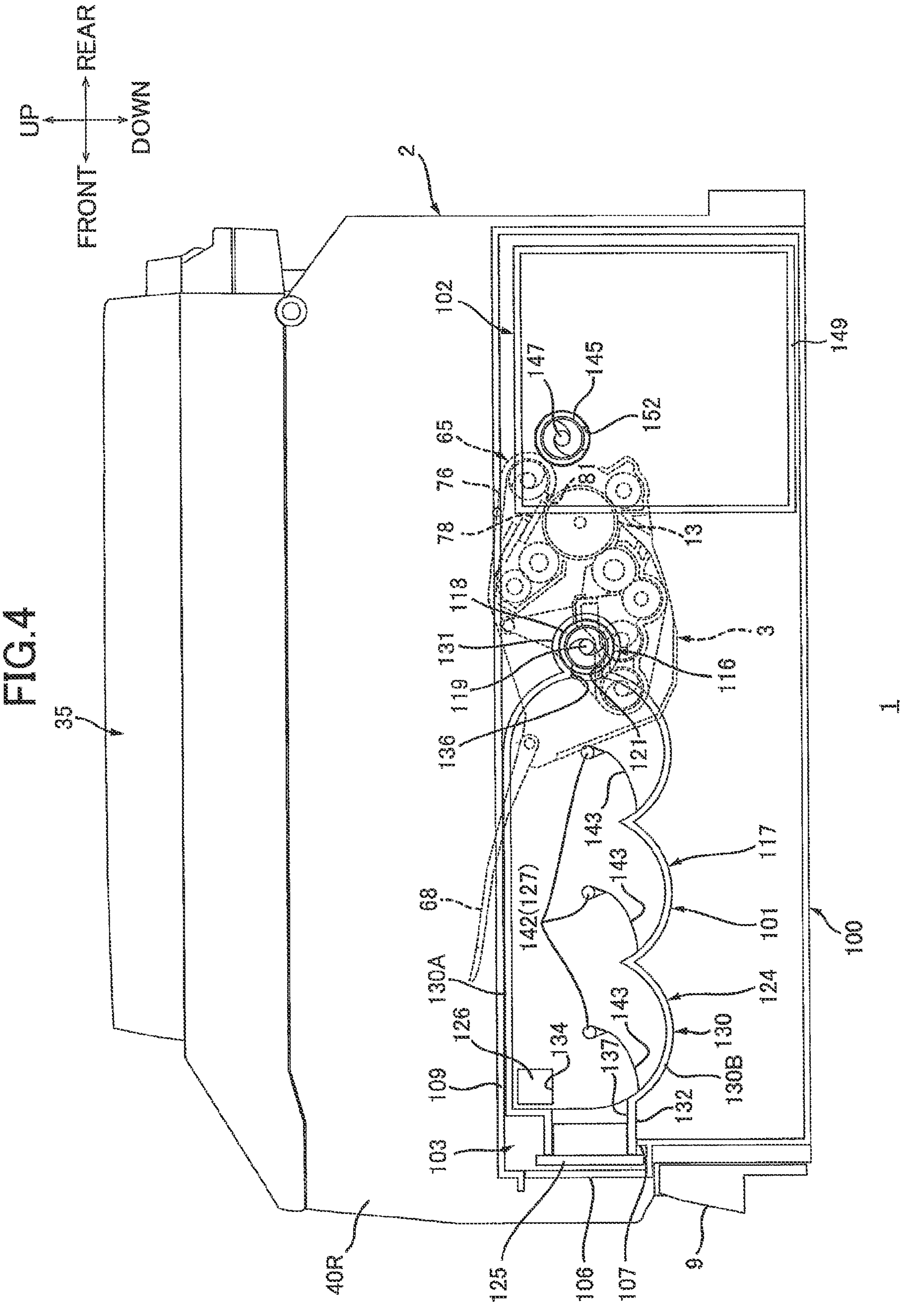
FIG. 4 is a cross-sectional side view of a toner supply unit of the image forming apparatus illustrated in FIG. 1 and illustrating a toner container at its first position.

As illustrated in FIGS. 2 and 4, the second accommodation wall 40R constitutes a right wall of the main casing 2. That is, the second accommodation wall 40R is positioned rightward of and spaced away from the first accommodation wall 40L. The second accommodation wall 40R extends in the frontward/rearward direction and the upward/downward direction. The second accommodation wall 40R provides an internal space in which a circuit board 45 formed with a hole 46 is accommodated.

As illustrated in FIG. 2, the holes 42 are positioned at a generally center portion of the second accommodation wall 40R in the frontward/rearward direction. The holes 42 extend through left and right walls of the second accommodation wall 40R in the leftward/rightward direction. The holes 42 are adapted to allow the connecting tube body 118 of the connecting tube 116 described later to extends therethrough such that the connecting tube body 118 is fitted with the holes 42.

The circuit board 45 is positioned between the developing unit 12 and a toner container 117 of the toner supply unit 101 described later in the leftward/rightward direction.

The hole 46 extends through the thickness of the circuit board 45, and is positioned at a position in alignment with the holes 42 of the second accommodation wall 40R in the leftward/rightward direction. The hole 46 is adapted to allow the connecting tube body 118 of the connecting tube 116 described later to extends therethrough such that the connecting tube body 118 is fitted with the hole 46.

The first inner wall 41L is positioned inward of and adjacent to the first accommodation wall 40L in the leftward/rightward direction.

The groove 48 is recessed outward from an inner surface of the first inner wall 41L in the leftward/rightward direction. Incidentally, the groove 48 of the first inner wall 41L is identical to the groove 48 of the second inner wall 41R. Therefore, the groove 48 will be further described in detail in the description of the groove 48 of the second inner wall 41R.

The second inner wall 41R is positioned leftward of and adjacent to the second accommodation wall 40R. As illustrated in FIG. 8, the second inner wall 41R is plate shaped extending in the frontward/rearward direction and the upward/downward direction.

The groove 48 is adapted to guide a shaft of the photosensitive drum 13 of the process cartridge 3. The groove 48 is recessed outward from an inner surface of the second inner wall 41R in the leftward/rightward direction. The groove 48 extends diagonally downward and rearward from a generally center portion of the opening 7 in the frontward/rearward direction. The groove 48 has a rear end portion positioned at a generally center portion of the second inner groove 41R in the upward/downward direction.

The groove 49 is adapted to guide the connecting portion 69 of the process cartridge 3. The groove 49 is positioned frontward of the groove 48, and is recessed outward from the inner surface of the second inner wall 41R in the leftward/rightward direction. The groove 49 extends downward from a front end portion of the groove 48 and is then curved rearward.

The groove 50 is adapted to guide the protruding sleeve 77 of the process cartridge 3. The groove 50 is positioned rearward of the groove 48. The groove 50 is recessed outward from the inner surface of the second inner wall 41R in the leftward/rightward direction. The groove 50 extends diagonally downward and rearward from a rear end portion of the opening 7. The groove 50 has a rear end portion positioned rearward of the rear end portion of the opening 7, and rearward and upward of the rear end portion of the groove 48.

4. Accommodation Box, Toner Supply Unit and Waste Toner Collecting Portion

As illustrated in FIGS. 2 and 4, the image forming apparatus 1 includes an accommodation box 100 formed with openings 103 and 104, the toner supply unit 101, and a waste toner collection unit 102 for collecting waste toner removed from the photosensitive drum 13.

(1) Accommodation Box

The accommodation box 100 is positioned rightward of the second accommodation wall 40R, and is generally box shaped. The accommodation box 100 is adapted to accommodate the toner supply unit 101 and the waste toner collection unit 102. The accommodation box 100 includes a protruding portion 106, an upper cover 109, a side cover 110, a boss 111 formed with a hole 112, and a boss 113 formed with a recessed portion 114.

The opening 103 is positioned at an upper portion of the toner supply unit 101. The opening 103 extends through a thickness of an upper wall of the accommodation box 100 in the upward/downward direction.

The opening 104 is positioned rightward of the waste toner collection unit 102. The opening 104 extends through a thickness of a right side wall of the accommodation box 100 in the leftward/rightward direction.

The protruding portion 106 constitutes a front end portion of the accommodation box 100. The protruding portion 106 protrudes frontward from an upper portion of a front wall of the accommodation box 100. The protruding portion 106 includes a support portion 107.

The support portion 107 protrudes upward from a lower wall of the protruding portion 106. The support portion 107 is adapted to support a reception sleeve 132 of the toner container 117 described later. The support portion 107 supports the reception sleeve 132 at its first position.

The upper cover 109 constitutes an upper end portion of the accommodation box 100. The upper cover 109 is fixed to a body portion 130 of a container body 124 of the toner container 117. The upper cover 109 is plate shaped extending in the frontward/rearward direction and the leftward/rightward direction. The upper cover 109 has a front end portion positioned frontward of the protruding portion 106. The upper cover 109 is pivotally movable together with the toner container 117 about the connecting tube 116 described later. The upper cover 109 is pivotally movable between a closed position closing the opening 103 and an open position opening the opening 103.

As illustrated in FIG. 2, the side cover 110 is positioned rightward of a waste toner box 149 of the waste toner collection unit 102 described later. The side cover 110 is plate shaped extending in the frontward/rearward direction and the upward/downward direction. The side cover 110 is pivotally movable about a rear end portion thereof between a closed position closing the opening 104 and an open position opening the opening 104.

The boss 111 is positioned rightward of the hole 46 of the circuit board 45, and is positioned at a right surface of the second accommodation wall 40R. The boss 111 is generally cylindrical extending in the leftward/rightward direction.

The boss 111 is formed with the hole 112 at a radially center portion thereof. The hole 112 extends through a length of the boss 111, and in alignment with the holes 42 of the second accommodation wall 40R in the leftward/rightward direction.

The boss 113 is positioned rightward of the boss 111, and is spaced away from and in alignment with the boss 111 in the leftward/rightward direction. The boss 113 is positioned at a left surface of a right wall of the accommodation box 100. The boss 113 is generally cylindrical extending in the leftward/rightward direction.

The recessed portion 114 is recessed rightward from a left surface of the boss 113. The recessed portion 114 is adapted to receive a right end portion of the connecting tube 116, preventing rotation of the connecting tube 116.

(2) Toner Supply Unit

The toner supply unit 101 includes the connecting tube 116 and the toner container 117.

The connecting tube 116 extends in the leftward/rightward direction, and having one end portion fitted with the boss 113. The connecting tube 116 extends through the hole 112 of the boss 111, the holes 42 of the second accommodation wall 40R, and the hole 46 of the circuit board 45. The connecting tube 116 has another end portion positioned inside the main casing 2. Thus, the connecting tube 116 cannot be detached from the main casing 2. As illustrated in FIG. 7, the left end portion of the connecting tube 116 is positioned rearward of the connecting portion 69. As illustrated in FIGS. 2 and 7, the connecting tube 116 includes the connecting tube body 118 formed with an inlet opening 121 and an outlet opening 122, and an auger screw 119.

The connecting tube body 118 is generally hollow cylindrical extending in the leftward/rightward direction, and each end portion of the connecting tube body 118 in the leftward/rightward direction is closed.

As illustrated in FIG. 4, the inlet opening 121 is positioned at the right end portion of the connecting tube body 118. The inlet opening 121 extends through a thickness of the front end portion of the connecting tube body 118 in the frontward/rearward direction.

The outlet opening 122 is positioned at the left end portion of the connecting tube body 118. The outlet opening 122 extends through the thickness of the front end portion of the connecting tube body 118 in the frontward/rearward direction, and is in communication with the hole 74 of the connecting portion 69.

The auger screw 119 is positioned in the connecting tube body 118, and extends in the leftward/rightward direction. The auger screw 119 has a right end portion rotatably supported to a right wall of the connecting tube body 118. The auger screw 119 has a left end portion rotatably supported to a left wall of the connecting tube body 118.

Figure 5:
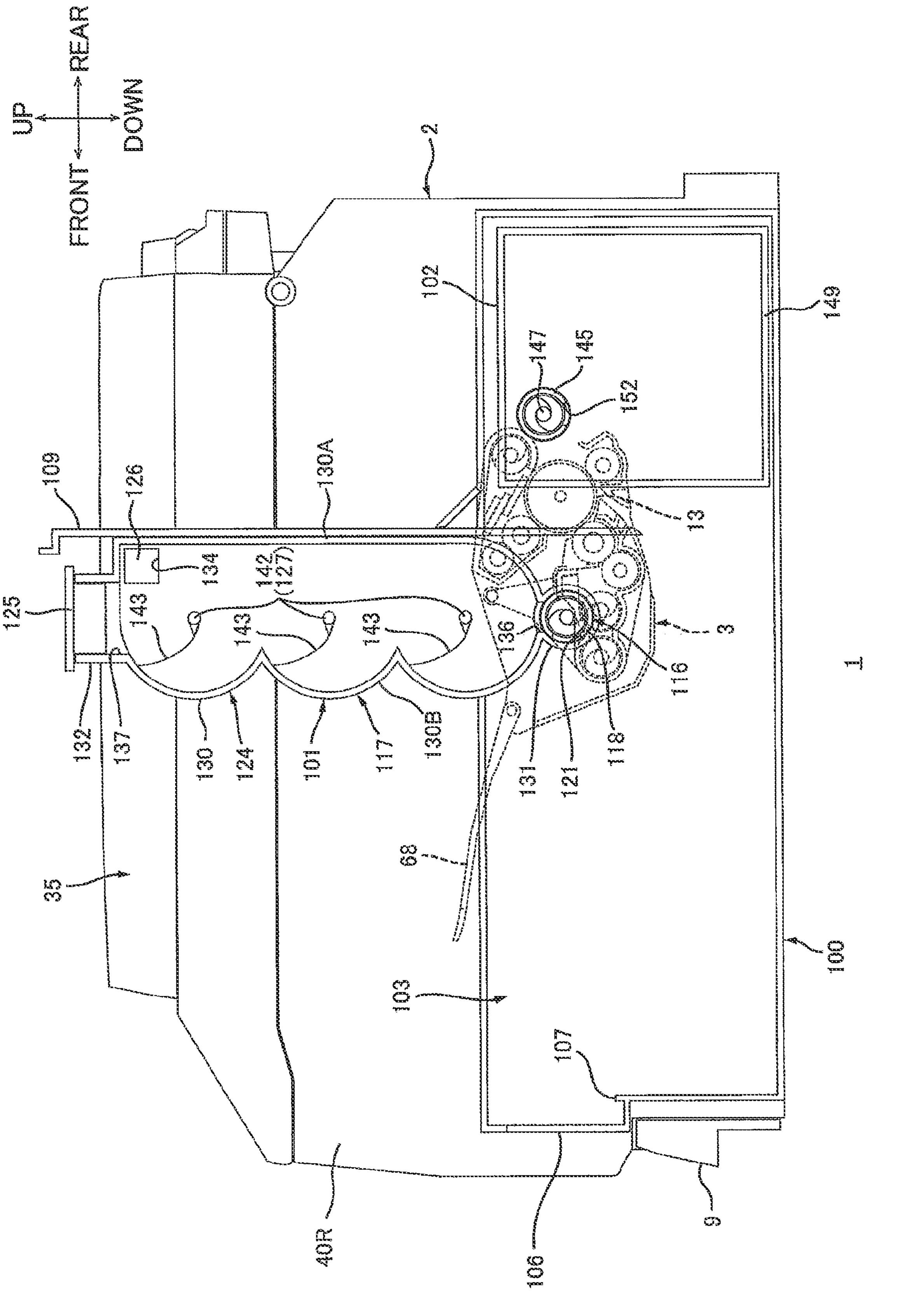
FIG. 5 is a view illustrating the toner container at its second position of the image forming apparatus illustrated in FIG. 4.
Figure 6:
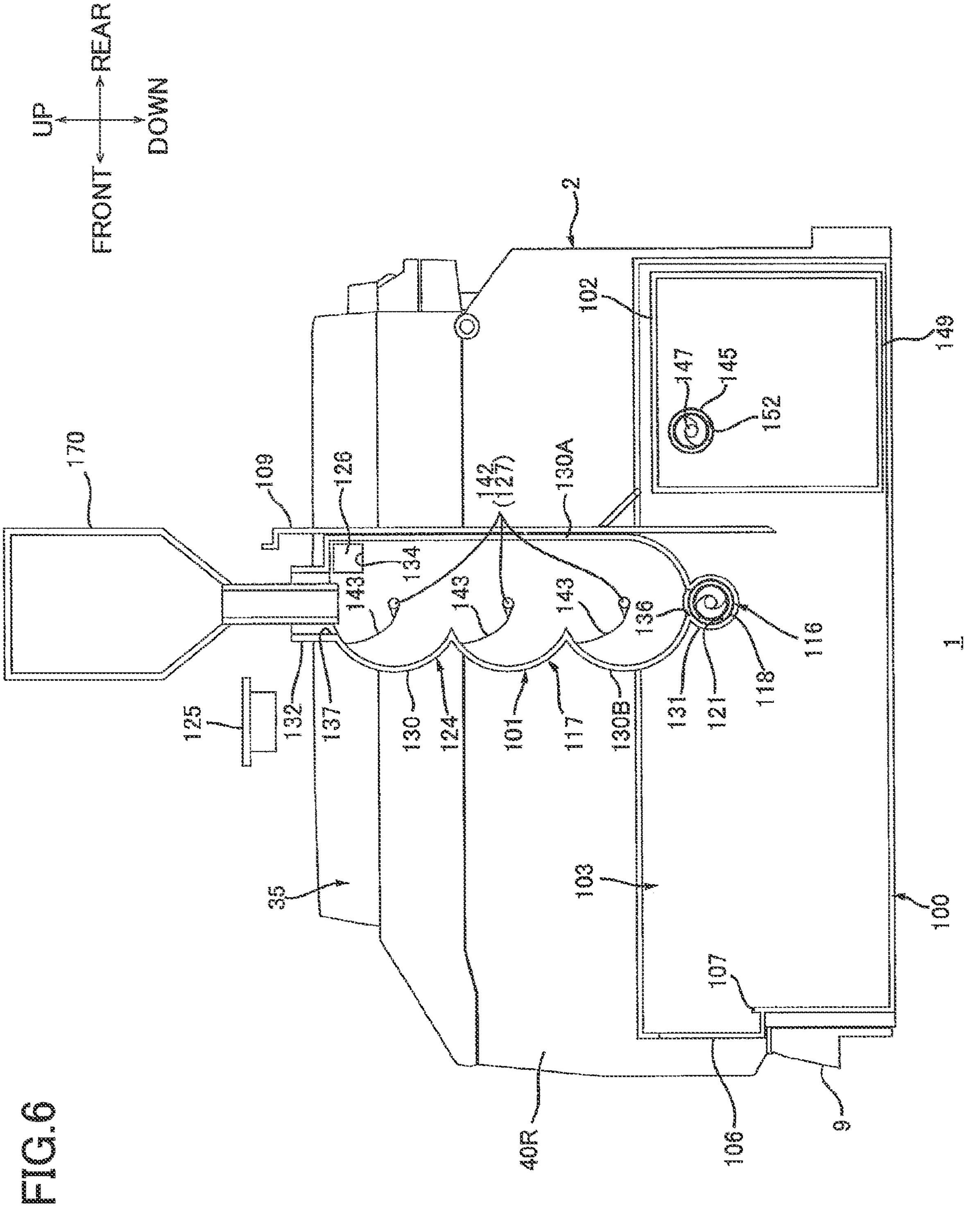
FIG. 6 is a view for description of toner replenishment to the toner container positioned at the second position illustrated in FIG. 5.

The toner container 117 is a container for accommodating toner therein. The toner container 117 is pivotally movable about the connecting tube 116 between a first position (FIGS. 2 and 4) and a second position (FIGS. 5 and 6). In the first position, the toner container 117 extends frontward from the connecting tube 116, and in the second position, the toner container 117 extends upward from the connecting tube 116. The toner container 117 has one end portion connected to the connecting tube 116 and another end portion positioned away from the connecting tube 116. Incidentally, the following description regarding the toner container 117 will be based on the first position of the toner container 117. As illustrated in FIGS. 2 and 4, the toner container 117 includes the container body 124 formed with an inlet opening 137, a lid 125, a filter 126, and three conveying members 127.

The container body 124 is a hollow sleeve-like member extending between one end and another end of the toner container 117. The container body 124 also extends in an extending direction of the connecting tube 116. As illustrated in FIG. 2, a length of the container body 124 between the one end and the other end is greater than a length in the extending direction of the connecting tube 116. The container body 124 includes the body portion 130 formed with a hole 134, a shutter 131 formed with a communication opening 136, and the reception sleeve 132.

The body portion 130 is generally rectangular cylindrical. The body portion 130 includes a first wall 130A and a second wall 130B.

The first wall 130A is positioned above the conveying members 127 when the toner container 117 is at the first position.

The second wall 130B is positioned below the conveying members 127 when the toner container 117 is at the first position.

The hole 134 is positioned closer to the reception sleeve 132 than the frontmost rotation shaft 142 of the conveying member 127 to the reception sleeve 132 in the extending direction of the toner container 117. Further, the hole 134 is positioned closer to the first wall 130A than the rotation shafts 142 to the first wall 130A in a facing direction between the first wall 130A and the second wall 130B. The hole 134 extends through a left wall of the body portion 130 in the leftward/rightward direction.

The shutter 131 is positioned at one end portion of the toner container 117. The shutter 131 is continuous with one end portion of the container body 124. The shutter 131 is generally hollow cylindrical extending in the leftward/rightward direction. The connecting tube body 118 is positioned inside of and inseparably fitted with the shutter 131. Thus, the toner container 117 is inseparable from the accommodation box 100.

The communication opening 136 extends through a front end portion of the shutter 131 and a rear end portion of the body portion 130 in the frontward/rearward direction. The communication opening 136 is adapted to provide communication between the shutter 131 and the container body 124. The communication opening 136 can be communicated with the inlet opening 121 of the connecting tube 116 when the toner container 117 is positioned at the first position.

The reception sleeve 132 is positioned at the other end portion of the toner container 117. The reception sleeve 132 is generally hollow cylindrical extending frontward from the other end portion of the container body 124. The reception sleeve 132 is supported to the support portion 107 of the protruding portion 106 of the accommodation box 100 when the toner container 117 is at the first position.

The inlet opening 137 is positioned at the other end portion of the container body 124. The inlet opening 137 extends through the other end portion of the container body 124 in the extending direction of the toner container 117. The inlet opening 137 is a hollow space of the reception sleeve 132.

The lid 125 is attachable to and detachable from the inlet opening 137 of the reception sleeve 132.

The filter 126 is fitted in the hole 134. The filter 126 is adapted to allow air to pass therethrough, but prevent toner from passing therethrough. The filter 126 is made from urethane foam, for example.

The three conveying members 127 are positioned between the shutter 131 and the reception sleeve 132. The three conveying members 127 are arrayed in the extending direction of the toner container 117, such that a space is provided between neighboring convener members 127. Each conveying member 127 includes the rotation shaft 142 and a blade 143.

Each of the rotation shafts 142 is generally solid cylindrical extending in the leftward/rightward direction. Each rotation shaft 142 is positioned below the filter 126. Each rotation shaft 142 has a left end portion rotatably supported to the left wall of the container body 124, and has a right end portion rotatably supported to the right wall of the container body 124.

Each of the blades 143 extends radially outward from each of the rotation shafts 142. Each blade 143 is rotatable about an axis of each rotation shaft 142, so that the conveying members 127 agitate the toner in the container body 124 and conveys the toner to the connecting tube 116.

(3) Waste Toner Collecting Unit

The waste toner collection unit 102 is positioned rearward of the toner supply unit 101. As illustrated in FIGS. 4 and 8, the waste toner collection unit 102 includes a conveying tube 145 formed with holes 151, 152, a support portion 146, a screw 147, and the waste toner box 149.

As illustrated in FIG. 2, the conveying tube 145 is generally hollow cylindrical extending in the leftward/rightward direction. Each end of the conveying tube 145 in the leftward/rightward direction is closed. The conveying tube 145 extends through the second accommodation wall 40R of the main casing 2 in the leftward/rightward direction. The conveying tube 145 has a right end portion positioned inside the accommodation box 100. As illustrated in FIG. 8, the conveying tube 145 has a left end portion positioned rearward of the rear end portion of the groove 50 of the second inner wall 41R of the main casing 2. That is, as illustrated in FIG. 7, the protruding sleeve 77 of the process cartridge 3 is positioned frontward of the conveying tube 145.

The hole 151 is positioned at the left end portion of the conveying tube 145, and extends through a front end portion of the conveying tube 145 in the frontward/rearward direction. The hole 151 is in communication with the hole 82 of the protruding sleeve 77 of the drum cleaning unit 65.

As illustrated in FIG. 4, the hole 152 is positioned at the right end portion of the conveying tube 145. The hole 152 extends through a lower end portion of the conveying tube 145 in the upward/downward direction.

As illustrated in FIGS. 2 and 8, the support portion 146 is positioned at the left end portion of the conveying tube 145. The support portion 146 extends upward from an upper edge of the hole 151 of the conveying tube 145, and also extends frontward from a lower edge of the hole 151. The support portion 146 is curved along a circumferential surface of the waste toner accommodating portion 76 of the drum cleaning unit 65 of the process cartridge 3.

The screw 147 is positioned in the conveying tube 145, and extends in the leftward/rightward direction. The screw 147 has a right end portion rotatably supported to a right wall of the conveying tube 145. The screw 147 has a left end portion rotatably supported to a left wall of the conveying tube 145.

As illustrated in FIGS. 2 and 4, the waste toner box 149 is positioned at a rear end portion of the accommodation box 100. The waste toner box 149 is generally box shaped. The waste toner box 149 has an upper end portion through which the right end portion of the conveying tube 145 extends. The waste toner box 149 is adapted to receive waste toner conveyed by the conveying tube 145. The waste toner box 149 can be attached to and detached from the accommodation box 100 by opening the side cover 110 of the accommodation box 100.

5. Replenishment of Toner

Toner replenishment to the toner container 117 will next be described.

For replenishment of toner with respect to the toner container 117, the user moves the toner container 117 from the first position to the second position as illustrated in FIGS. 4 and 5.

For moving the toner container 117 from the first position to the second position, the user grips and lifts upward the front end portion of the upper cover 109 of the accommodation box 100. Accordingly, the toner container 117 is pivotally moved upward about the connecting tube 116 such that the inlet opening 137 is directed upward. Thus, the toner container 117 extends upward from the connecting tube 116 to be positioned at the second position.

When the toner container 117 is at the second position, the filter 126 of the body portion 130 is positioned above the rotation shafts 142 of the conveying members 127.

Further, the communication opening 136 is positioned above the inlet opening 121 of the connecting tube body 118. Accordingly, an inner surface of the shutter 131 is brought into confrontation with the inlet opening 121. Thus, the shutter 131 closes the inlet opening 121 of the connecting tube body 118.

Further, an outer surface of the connecting tube body 118 is brought into confrontation with the communication opening 136. Thus, the connecting tube body 118 closes the communication opening 136 of the container body 124.

Then, the user removes the lid 125 from the inlet opening 137 of the toner container 117.

Then, the user inserts a toner replenishment vessel 170 into the inlet opening 137 to replenish toner to the toner container 117.

Upon completion of the toner replenishment, the user attaches the lid 125 to the inlet opening 137 of the toner container 117.

Then, the user moves the toner container 117 from the second position to the first position.

For moving the container from the second position to the first position, the user grips the upper cover 109, and lays the toner container 117 frontward about the connecting tube 116. Then, the user permits the reception sleeve 132 to be seated on the support portion 107 of the protruding portion 106 as illustrated in FIG. 4. Thus, the toner container 117 can be positioned at the first position.

In this case, the filter 126 is positioned above the rotation shafts 142 of the conveying members 127.

6. Image Forming Operation

After start of image forming operation in the image forming apparatus 1, the three conveying members 127 convey toner in the toner container 117 into the connecting tube body 118 of the connecting tube 116 through the communication opening 136 and the inlet opening 121 as illustrated in FIG. 4.

Then, the auger screw 119 conveys the toner in the connecting tube body 118 leftward as illustrated in FIG. 2.

The toner conveyed to a left portion of the connecting tube body 118 is conveyed to the right end portion of the connection sleeve 72 through the outlet opening 122 of the connecting tube body 118 and the hole 74 of the connection sleeve 72.

Then, the first screw 90 of the developing unit 12 conveys the toner conveyed to the right end portion of the connection sleeve 72 toward the conveying chamber 94. The first screw 90 conveys the toner conveyed to the conveying chamber 94 leftward, and supplies toner to the developing chamber 95 through the communication opening 96.

The toner in the developing chamber 95 is supplied to the supply roller 17.

Then, the supply roller 17 supplies toner in the developing chamber 95 to the developing roller 16. In this case, the toner is subjected to triboelectric charging with positive polarity between the developing roller 16 and the supply roller 17, and is carried on the developing roller 16. The blade 18 regulates a thickness of the toner layer carried on the developing roller 16.

The toner carried on the developing roller 16 is supplied to the electrostatic latent image formed on the surface of the photosensitive drum 13. Thus, the toner image is carried on the surface of the photosensitive drum 13.

As illustrated in FIG. 1, the sheet P is supplied one by one to the portion between the photosensitive drum 13 and the transfer roller 15 at a prescribed timing. Thus, the toner image on the surface of the photosensitive drum 13 is transferred to the sheet P when the sheet P passes through the portion between the photosensitive drum 13 and the transfer roller 15.

Then, the sheet P is heated and pressed when the sheet P passes through a portion between the heat roller 5A and the pressure roller 5B. Thus, the toner image on the sheet P is thermally fixed to the sheet P. Then, the sheet P is delivered onto the cover 8.

Incidentally, in the image forming operation, the developing unit 12 is displaced relative to the photosensitive drum 13 due to the rotation of the photosensitive drum 13 and the developing roller 16. The developing unit 12 is slightly moved in the frontward/rearward direction about the shaft 88 as a fulcrum as illustrated in FIG. 1.

Further, waste toner remaining on the surface of the photosensitive drum 13 is scraped and removed by the cleaning member 78 of the drum cleaning unit 65, and is accommodated in the waste toner accommodating portion 76.

The screw 79 conveys the waste toner in the waste toner accommodating portion 76 rightward as illustrated in FIG. 2.

The waste toner conveyed to a right portion of the waste toner accommodating portion 76 is flowed into the conveying tube 145 through the holes 82, 151 as illustrated in FIG. 7.

The screw 147 conveys the waste toner in the conveying tube 145 toward the waste toner box 149.

7. Attachment and Detachment of Process Cartridge

For detaching the process cartridge 3 from the main casing 2, the user positions the manual insertion tray 22 at the support position as illustrated in FIG. 7.

Then, the user positions the cover 8 at its open position, and grips the handle 68 to pull out the process cartridge 3 upward. Accordingly, each end portion of the photosensitive drum 13 in the leftward/rightward direction is guided by each groove 48 of each of the first and second inner walls 41L, 41R. Further, the connecting portion 69 of the process cartridge 3 is guided by the groove 49, and the protruding sleeve 77 of the drum cleaning unit 65 is guided by the groove 50. As a result, the process cartridge 3 can be detached from the main casing 2.

For attaching the process cartridge 3 to the main casing 2, the user positions the manual insertion tray 22 at the support position, and pushes the process cartridge 3 through the opening 7 while the cover 8 is maintained at its open position. Then, the user positions the cover 8 at its closed position, and positions the manual insertion tray 22 at its accommodated position. Thus, the process cartridge 3 can be attached to the main casing 2.

8. Function and Effect (1) According to the image forming apparatus 1, toner accommodated in the toner container 117 is supplied to the developing unit 12 through the connecting tube 116 as illustrated in FIGS. 2 and 4.

When the toner is to be replenished into the toner container 117 in accordance with the decrease in toner amount in the toner container 117, the toner container 117 is pivotally moved about the connecting tube 116 to the second position as illustrated in FIGS. 5 and 6, so that the inlet opening 137 is positioned above the position of the inlet opening 137 at the first position of the toner container 117.

Therefore, the user can easily replenish toner into the toner container 117 through the inlet opening 137.

(2) According to the image forming apparatus 1, the user positions the toner container 117 to the second position at which the inlet opening 137 is positioned above the inlet opening 137 at the first position, and a longitudinal direction of the toner container 117 is directed in the upward/downward direction as illustrated in FIGS. 5 and 6.

Therefore, the user can replenish the toner through the inlet opening 137 such that the toner is successively increased upward in a direction from the bottom of the toner container 117 without scattering of the toner.

Further, as illustrated in FIG. 4, the toner container 117 is to be positioned at the first position which the inlet opening 137 is positioned below the inlet opening 137 at the second position. Thus, a compact image forming apparatus in the upward/downward direction can be obtained.

(3) According to the image forming apparatus 1, as illustrated in FIG. 4, toner in the toner container 117 can be stably conveyed to the connecting tube 116 by the conveying member 127.

(4) According to the image forming apparatus 1, as illustrated in FIG. 6, the filter 126 can allow air pushed by toner to pass therethrough when the toner is replenished into the toner container 117.

Therefore, the user can efficiently replenish toner into the toner container 117 through the inlet opening 137.

Further, the image forming apparatus 1 can restrain toner from reaching the filter 126, because the filter 126 is positioned above the rotation shafts 142 of the conveying members 127 as illustrated in FIGS. 4 and 5 not only in the first position but also in the second position of the toner container 117.

As a result, clogging of the filter 126 by the toner can be restrained.

(5) According to the image forming apparatus 1, the toner container 117 is pivotally movably supported to the main casing 2 through the connecting tube 116 as illustrated in FIGS. 4 and 5.

Therefore, toner in the toner container 117 can be stably supplied to the developing unit 12.

(6) According to the image forming apparatus 1, the circuit hoard 45 is positioned between the toner container 117 and the developing unit 12 as illustrated in FIG. 2.

Therefore, effective layout of the circuit board 45, the toner container 117, and the developing unit 12 with respect to the main casing 2 can be obtained.

(7) According to the image forming apparatus 1, toner in the connecting tube 116 can be reliably conveyed to the developing unit 12 by the auger screw 119 as illustrated in FIG. 2.

(8) According to the image forming apparatus 1, the inlet opening 121 of the connecting tube 116 is closed when the user positions the toner container 117 at the second position for toner replenishment as illustrated in FIG. 6.

Therefore, the shutter 131 prevents toner from being flowed into the connecting tube 116 during replenishment of toner into the toner container 117. After completion of replenishment of toner into the toner container 117, toner in the toner container 117 is supplied to the connecting tube 116 when the toner container 117 is moved to the first position to open the inlet opening 121 of the connecting tube 116.

(9) According to the image forming apparatus 1, as illustrated in FIG. 4, the lid 125 closes the inlet opening 137 so that the lid 125 can prevent the toner from leaking from the inlet opening 137 during pivotal movement of the toner container 117.

Further, as illustrated in FIG. 6, the inlet opening 137 can be opened by removing the lid 125 by the user for replenishing the toner into the toner container 117.

(10) According to the image forming apparatus 1, the inlet opening 137 is positioned higher than the main casing 2 and the reading unit 35 when the toner container 117 is at the second position as illustrated in FIGS. 5 and 6. Therefore, the user can easily replenish toner into the toner container 117 through the inlet opening 137.

Second Embodiment

1. Outline of Image Forming Apparatus

An image forming apparatus 1A according to a second embodiment will next be described with reference to FIGS. 9 through 11 wherein like parts and components are designated by the same reference numerals as those shown in the first embodiment to avoid duplicating description.

In the first embodiment, as illustrated in FIGS. 4 and 5, the communication opening 136 and the inlet opening 121 are communicated with each other when the toner container 117 is at the first position, and the communication opening 136 is not communicated with the inlet opening 121 when the toner container 117 is at the second position.

Figure 9:
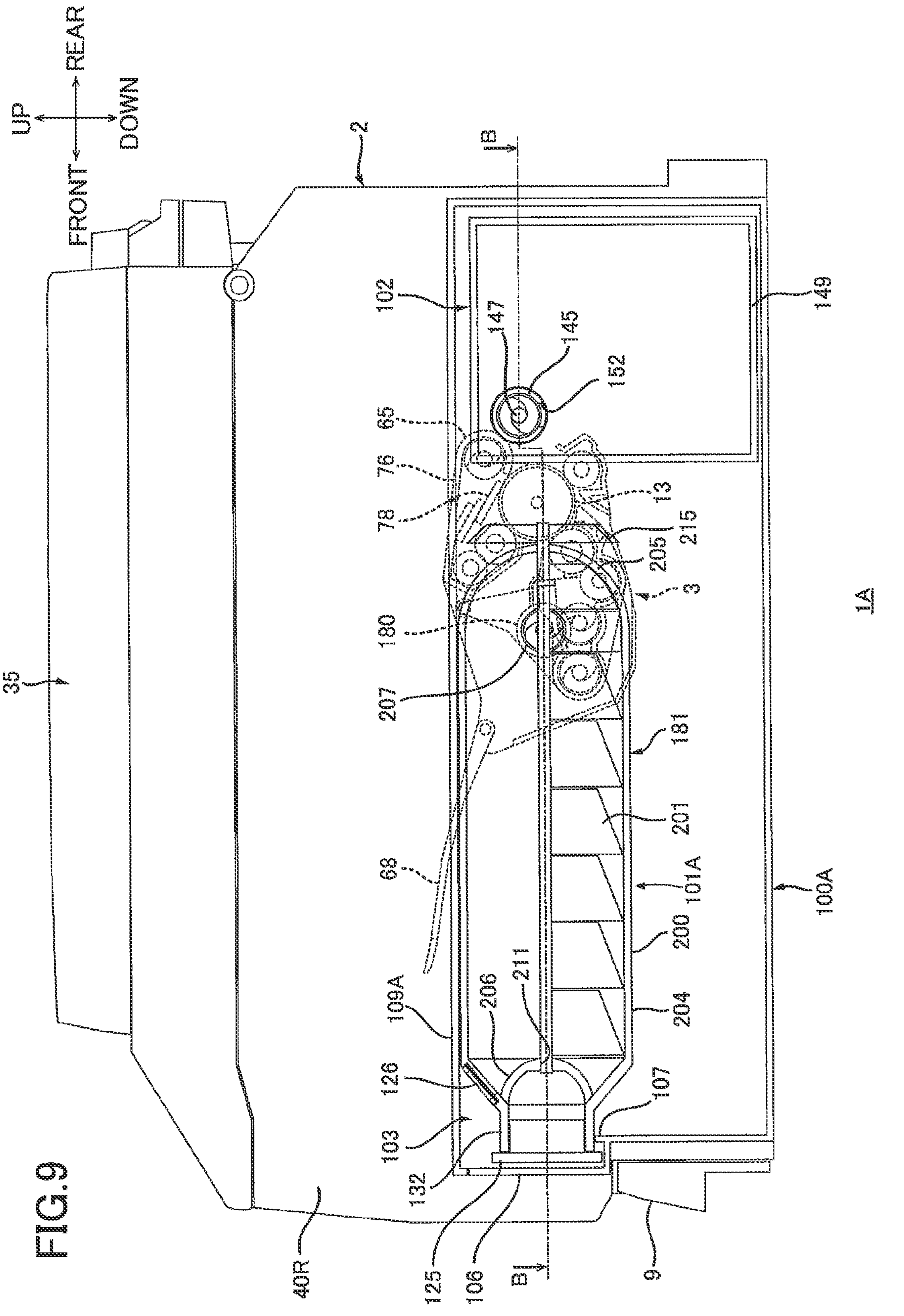
FIG. 9 is a cross-sectional view of an image forming apparatus according to a second embodiment and taken along a plane passing through a toner supply unit and illustrating a toner container at its first position.
Figure 10:
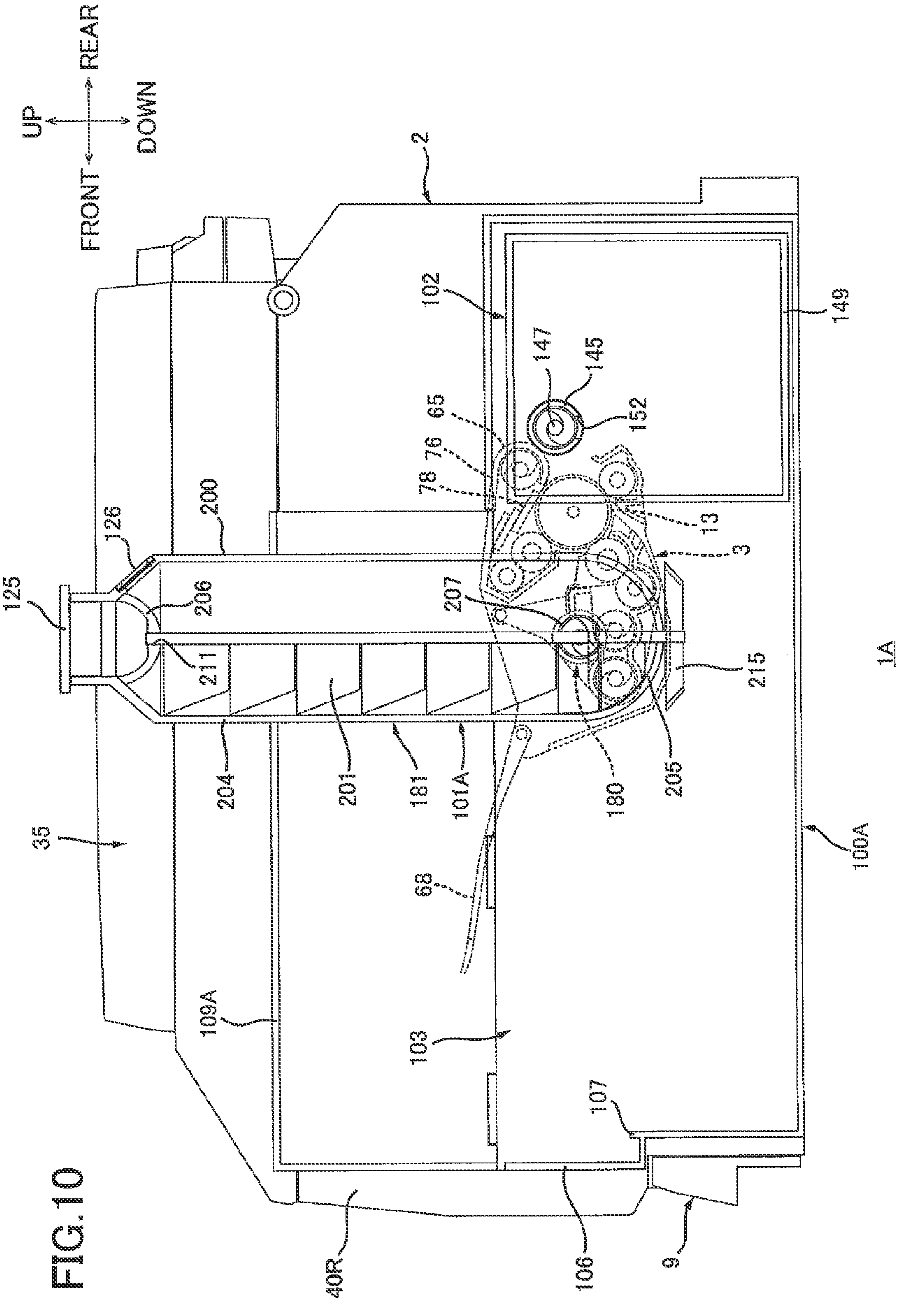
FIG. 10 is a view of the image forming apparatus according to the second embodiment, and illustrating the toner container at its second position.
Figure 11:
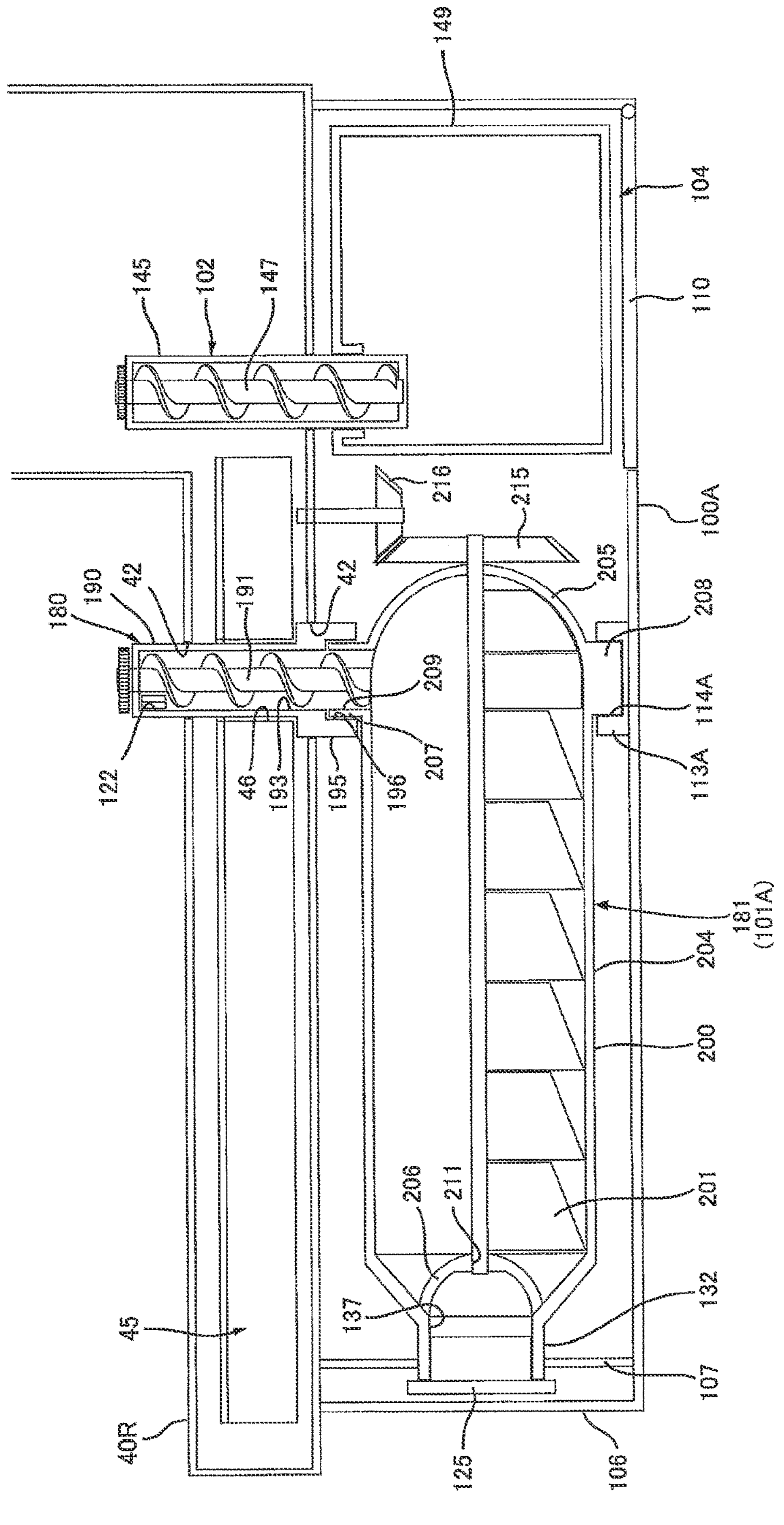
FIG. 11 is a cross-sectional view taken along a line B-B of FIG. 9.

In contrast, in the second embodiment, an inlet opening 193 of a connecting tube 180 and a communication opening 209 of a toner container 181 are communicated with each other as illustrated in FIG. 11 at both a first position and a second position of the toner container 181 as illustrated in FIGS. 9 and 10. Further, in the second embodiment, the toner container 181 has a bottom wall 205 positioned below the connecting tube 180 when the toner container 181 is at its second position.

2. Structure (1) Accommodation Box

In the first embodiment, the upper cover 109 of the accommodation box 100 is fixed to the container body 124. In contrast, in the second embodiment, an upper cover 109A is not fixed to a container body 200 but is pivotally movable about a left end portion of the upper cover 109A. FIG. 10 illustrates an open position of the upper cover 109A and FIG. 9 illustrates a closed position thereof.

(2) Toner Supply Unit

In the second embodiment, a toner supply unit 101A includes the connecting tube 180 and the toner container 181 as illustrated in FIGS. 9 and 11.

The connecting tube 180 extends in the leftward/rightward direction. The connecting tube 180 has one end portion fitted with the hole 42 of the right wall of the second accommodation wall 40R, and has another end portion positioned inside the main casing 2 and extending through the hole 42 of the left wall of the second accommodation wall 40R, Thus, the connecting tube 180 cannot be detached from the main casing 2. The connecting tube 180 includes a connecting tube body 190 formed with the inlet opening 193, a boss 195 formed with a recessed portion 196, and an auger screw 191.

The connecting tube body 190 is generally hollow cylindrical extending in the leftward/rightward direction. The connecting tube body 190 has a closed left end portion and an open right end portion. The connecting tube body 190 extends through the hole 42 of the left wall of the second accommodation wall 40R and the hole 46 of the circuit board 45.

The inlet opening 193 is positioned at the right end portion of the connecting tube body 190. The inlet opening 193 is a hollow space in the connecting tube body 190 extending in an extending direction of the connecting tube 180.

The boss 195 is positioned rightward of the connecting tube body 190, and is integral with the right end portion of the connecting tube body 190. The boss 195 is generally cylindrical extending in the leftward/rightward direction. The boss 195 has an outer diameter greater than that of the connecting tube body 190, and is fitted with the hole 42 formed in the right wall of the second accommodation wall 40R. The boss 195 has a right end portion positioned rightward of the second accommodation wall 40R. The boss 195 is in continuous with the connecting tube body 190, and extends through the holes 42 of the second accommodation wall 40R and the hole 46 of the circuit board 45 in the leftward/rightward direction.

The recessed portion 196 is recessed leftward from a right surface of the boss 195. The recessed portion 196 has an inner diameter greater than that of the connecting tube body 190. The recessed portion 196 is adapted to receive a first engagement portion 207 of the toner container 181 such that the first engagement portion 207 is rotatable relative to the recessed portion 196.

The auger screw 191 is positioned in the connecting tube body 190, and extends in the leftward/rightward direction. The auger screw 191 has a right end portion positioned at the right end portion of the connecting tube body 190. More specifically, the right end portion of the auger screw 191 is positioned in the communication opening 209 of the toner container 181. The auger screw 191 has a left end portion rotatably supported to a left wall of the connecting tube body 190.

The toner container 181 is pivotally movable about the connecting tube 180 between the first position (FIGS. 9 and 11) where the toner container 181 extends frontward from the connecting tube 180 and the second position (FIG. 10) where the toner container 181 extends upward from the connecting tube 180. The toner container 181 has one end portion connected to the connecting tube 180 and another end portion remote from the connecting tube 180. Incidentally, the following description is based on the first position of the toner container 181. As illustrated in FIGS. 9 and 11, the toner container 181 includes the container body 200, a conveying member 201, and the lid 125.

The container body 200 is a hollow cylindrical extending between one end portion and another end portion of the toner container 181. The container body 200 includes a body portion 204, the bottom wall 205, a support portion 206 formed with a hole 211, the first engagement portion 207 formed with the communication opening 209, a second engagement portion 208, and the reception sleeve 132.

The body portion 204 is generally hollow cylindrical. The conveying member 201 is accommodated in the body portion 204.

The bottom wall 205 is provided at one end portion of the body portion 204 to constitute one end portion of the container body 200, and is hollow semi-spherical. The bottom wall 205 closes the one end of the body portion 204.

The support portion 206 is positioned at another end portion of the body portion 204 as illustrated in FIGS. 9 and 11. The support portion 206 is curved toward the one end of the container body 200 from a peripheral end portion of the inlet opening 137.

The hole 211 extends through a central portion of the support portion 206 in a longitudinal direction of the container body 200.

As illustrated in FIG. 11, the first engagement portion 207 is positioned at a left end portion of the body portion 204, and protrudes leftward from the left end portion of the body portion 204. The first engagement portion 207 is generally cylindrical, and is rotatably fitted with the recessed portion 196 of the boss 195 of the connecting tube 180.

The communication opening 209 extends through the first engagement portion 207 in the leftward/rightward direction.

Thus, the communication opening 209 provides communication between the container body 200 and the connecting tube 180.

The second engagement portion 208 is positioned at a right end portion of the body portion 204. The second engagement portion 208 is aligned with the first engagement portion 207 in the leftward/rightward direction. The second engagement portion 208 protrudes rightward from the right end portion of the body portion 204. The second engagement portion 208 is generally cylindrical, and is rotatably fitted with a recessed portion 114A of a boss 113A.

With this structure, the toner container 181 is pivotally movable about the first engagement portion 207 and the second engagement portion 208 as fulcrums relative to the connecting tube 180 and an accommodation box 100A.

The conveying member 201 is positioned inside the container body 200 and extends between the inlet opening 137 and the bottom wall 205. The conveying member 201 has one end portion rotatably supported to the bottom wall 205, and has another end portion rotatably supported to the hole 211 of the of the support portion 206.

A drive gear 215 is fixed to the one end portion of the conveying member 201 at a position rearward of the bottom wall 205.

A main gear 216 is positioned rightward of the second accommodation wall 40R. As illustrated in FIG. 11, the main gear 216 is meshed with the drive gear 215 when the toner container 181 is at its first position.

3. Toner Replenishment

Next, toner replenishment to the toner container 181 will be described.

For replenishing toner to the toner container 181, a user positions the upper cover 109A of the accommodation box 100A to its open position as illustrated in FIG. 10. Then, the user grips the toner container 181 and pivotally moves the toner container 181 about the connecting tube 180 as the fulcrum so as to direct the inlet opening 137 upward. As a result, the toner container 181 extends upward from the connecting tube 180 to be positioned at the second position.

Then, similar to the first embodiment, the user removes the lid 125 from the inlet opening 137 of the toner container 181, and inserts the toner replenishing vessel 170 into the inlet opening 137 to replenish toner into the toner container 181.

Toner replenished through the inlet opening 137 is accumulated on the bottom wall 205 positioned below the connecting tube 180.

Toner is successively stacked, and is flowed into the connecting tube 180 through the communication opening 209.

Then, the user moves the toner container 181 to the first position, and moves the upper cover 109A to its closed position.

Thus, toner replenishment is completed.

Toner replenished into the container body 200 of the toner container 181 is supplied to the developing unit 12 by the auger screw 19.

4. Function and Effect

In the image forming apparatus 1A according to the second embodiment, toner replenished through the inlet opening 137 is accumulated on the bottom wall 205 positioned below the connecting tube 180.

The toner is successively stacked, and is flowed into the connecting tube 180.

Therefore, the structure can prevent the toner replenished through the inlet opening 137 of the toner container 181 from immediately flowing into the connecting tube 180.

Further, the second embodiment provides the function and effect similar to those of the first embodiment.

Third Embodiment

1. Outline of Image Forming Apparatus

An image forming apparatus 1B according to a third embodiment will be described with reference to FIGS. 12 through 14, wherein like parts and components are designated by the same reference numerals as those shown in the first embodiment to avoid duplicating description.

In the first embodiment, the image forming apparatus 1 is a monochromatic printer provided with the single process cartridge 3. On the other hand, in the third embodiment, the image forming apparatus 1B is a direct tandem type color laser printer provided with four process units 230 as illustrated in FIGS. 12 and 13.

A user can replenish toner to each of toner containers 241 of each of four process units 230.

2. Structure

Figure 12:
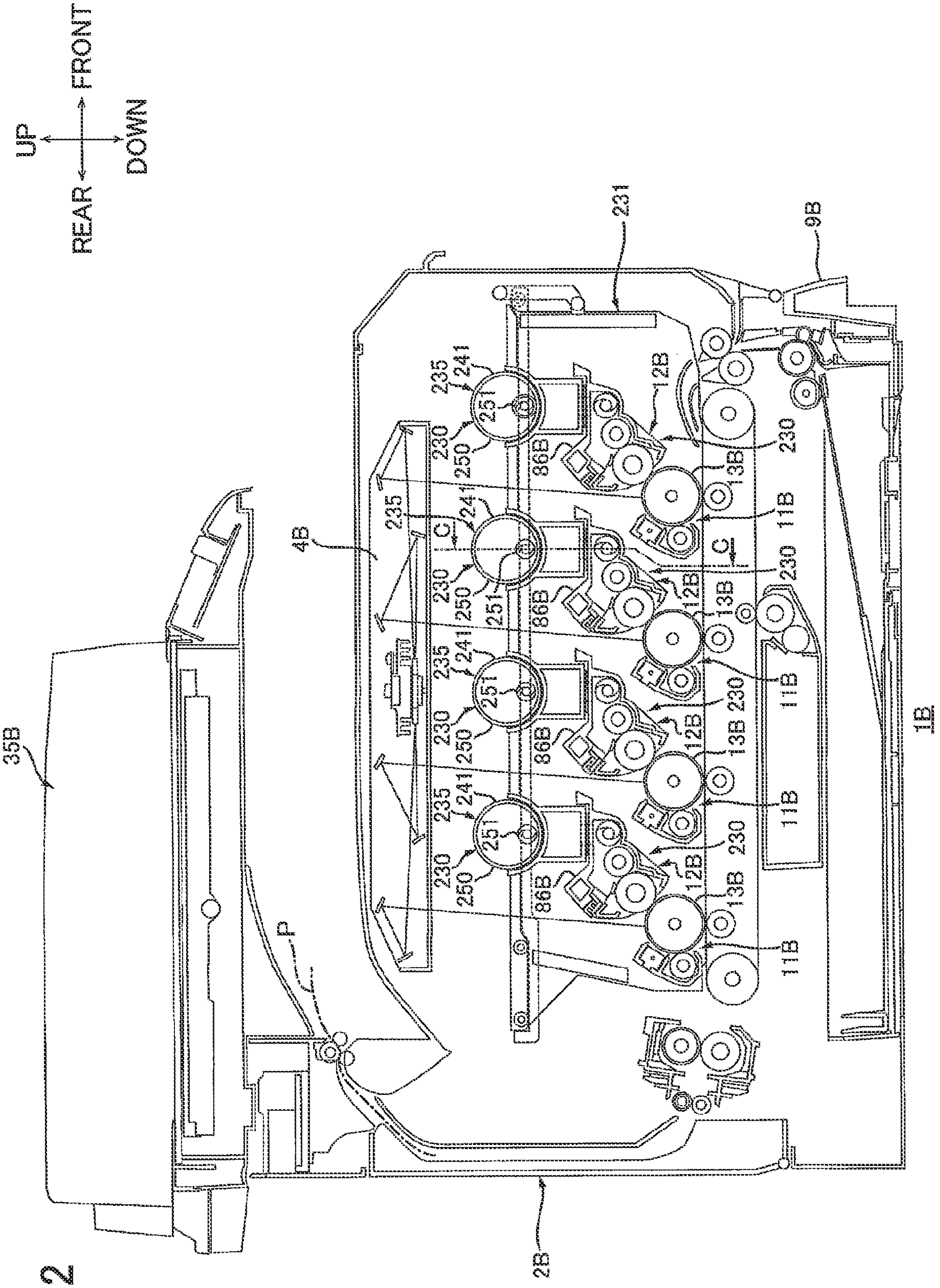
FIG. 12 is a central cross-sectional view of an image forming apparatus according to a third embodiment.
Figure 13:
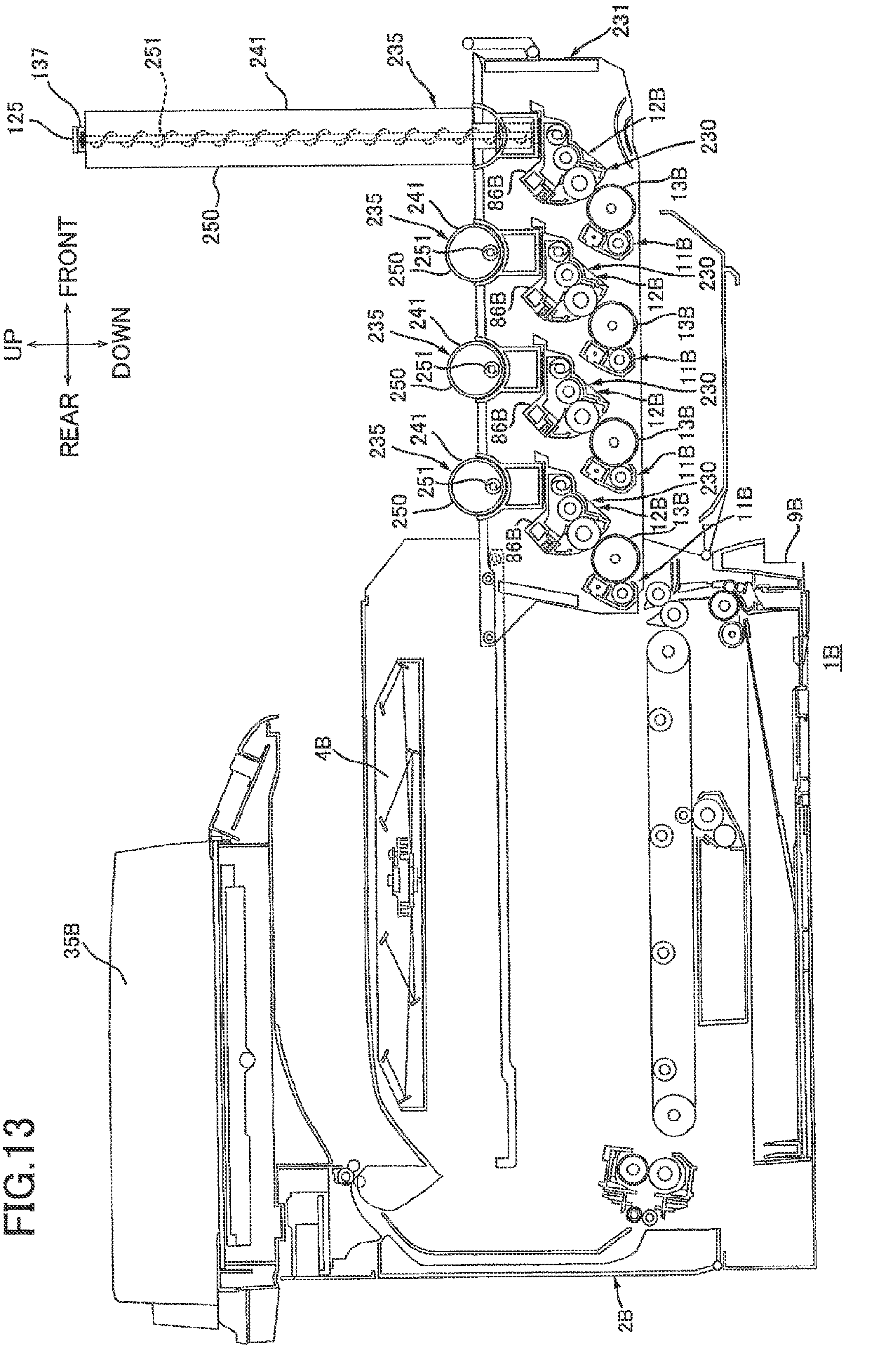
FIG. 13 is a view illustrating the image forming apparatus according to the third embodiment in a state where a drawer is pulled out.

As illustrated in FIGS. 12 and 13, the image forming apparatus 1B includes a drawer 231, the four process units 230, a scanner 4B, and a reading unit 35B.

The drawer 231 is generally box shaped, and is adapted to be pulled out of and pushed into a main casing 2B of the image forming apparatus 1B. The drawer 231 is adapted to support the four process units 230. The main casing 2B includes a sheet supply tray 9B.

The four process units 230 are supported to the drawer 231 and are arrayed in the frontward/rearward direction with a space between neighboring process units 230. Each process unit 230 includes a drum unit 11B supporting a photosensitive drum 13B, a developing unit 12B, and a toner supply unit 235 for supplying toner to the developing unit 12B. The developing unit 12B includes the developing roller 16, the supply roller 17, the blade 18, a developing frame 869, and a screw 90B.

Figure 14:
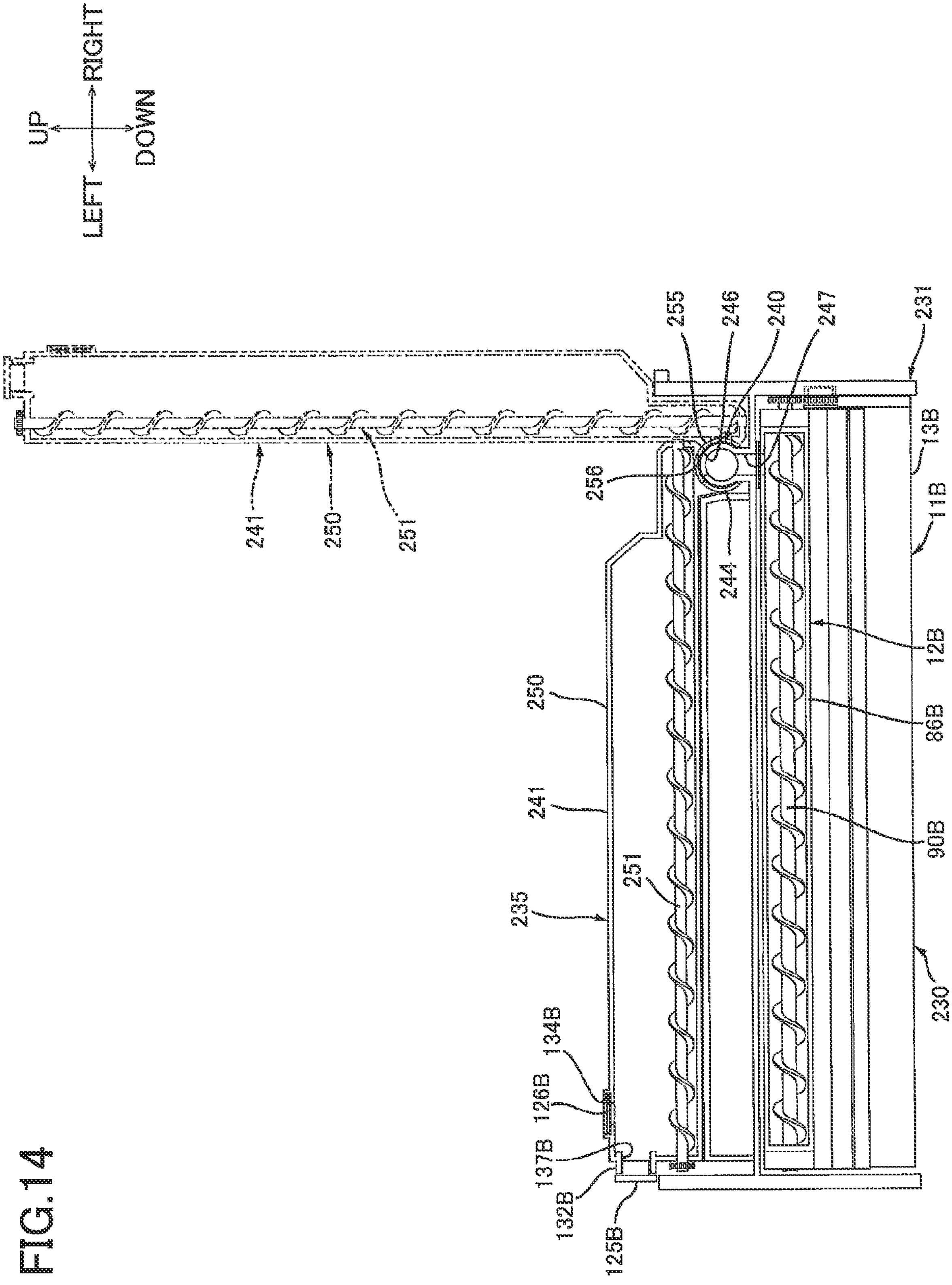
FIG. 14 is a cross-sectional view taken along a line C-C of FIG. 12.

The toner supply unit 235 includes a connecting tube 240 and the toner container 241 as illustrated in FIG. 14.

The connecting tube 240 is positioned at a right end portion of the developing unit 12B, and includes a connecting tube body 244 formed with an inlet opening 246 and an outlet opening 247.

The connecting tube body 244 is generally hollow cylindrical extending in the frontward/rearward direction.

The inlet opening 246 extends through an upper end portion of the connecting tube body 244 in the upward/downward direction.

The outlet opening 247 is positioned below the inlet opening 246, and extends through a lower end portion of the connecting tube body 244 in the upward/downward direction. Thus, the outlet opening 247 provides communication between the connecting tube body 244 and the developing frame 86B of the developing unit 12B.

The toner container 241 is pivotally movable about the connecting tube 240 as a fulcrum between a first position as illustrated in FIG. 12 and a solid line in FIG. 14, and a second position as illustrated in FIG. 13 and a two dotted chain line in FIG. 14. In the first position, the toner container 241 extends leftward from the connecting tube 240, and in the second position the toner container 241 extends upward from the connecting tube 240. The toner container 241 has one end portion connected to the connecting tube 240 and another end portion remote from the connecting tube 240. Incidentally, the following description as to the toner container 241 is based on a situation where the toner container 241 is at its first position. As illustrated in FIG. 14, the toner container 241 includes a container body 250 and an auger screw 251.

The container body 250 is hollow cylindrical extending between one end and another end of the toner container 241. The container body 250 includes an engagement sleeve 255 and a reception sleeve 132B similar to the reception sleeve 132 of the first embodiment.

The engagement sleeve 255 is provided at one end portion of the container body 250 positioned closer to the connecting tube 240 than the other end portion to the connecting tube 240. The engagement sleeve 255 is generally hollow cylindrical extending in the frontward/rearward direction. The engagement sleeve 255 and the container body 250 are communicated with each other by a communication opening 256. The engagement sleeve 255 receives therein the connecting tube body 244 of the connecting tube 240.

The communication opening 256 extends through an upper end portion of the engagement sleeve 255 and one end portion of the container body 250 in the upward/downward direction. The communication opening 256 is brought into communication with the inlet opening 246 of the connecting tube 240 when the toner container 241 is positioned at its first position.

The auger screw 251 extends between one end portion and another end portion of the container body 250, and is rotatably supported to the one end portion and another end portion of the container body 250. Incidentally, a lid 125B, a filter 126B, an inlet opening 137B, and a hole 134B are provided in the third embodiment those similar to the lid 125, the filter 126, the inlet opening 137, and the hole 134 in the first embodiment.

3. Toner Replenishment

Replenishment of toner to the toner container 241 will next be described.

As illustrated in FIG. 13, the drawer 231 is pulled out from the main casing 2B for replenishing toner to the toner container 241. Then, the user grips the toner container 241 of the toner supply unit 235, and pivotally moves the toner container 241 about the connecting tube 240 so as to position the inlet opening 137B upward. Thus, the toner container 241 extends upward from the connecting tube 240 to be positioned at the second position.

At the second position of the toner container 241, the communication opening 256 is moved rightward relative to the inlet opening 246.

Thus, an inner surface of the engagement sleeve 255 is brought into confrontation with the inlet opening 246, so that the engagement sleeve 255 closes the inlet opening 246 of the connecting tube body 244.

Further, the communication opening 256 is brought into confrontation with an outer surface of the connecting tube body 244, so that the connecting tube body 244 closes the communication opening 256 of the container body 250.

Then, similar to the first embodiment, the user removes the lid 125B from the inlet opening 137B of the toner container 241, and inserts the toner replenishing vessel 170 into the inlet opening 137B to replenish toner to the toner container 241.

After completion of the toner replenishment into the toner container 241, the user attaches the lid 125B to the inlet opening 137B of the toner container 241.

Then, the user pivotally moves the toner container 241 from the second position to the first position similar to the first embodiment.

Thus, the toner container 241 can be positioned at the first position.

Then, the toner in the toner container 241 is conveyed to the communication opening 256 by the auger screw 251 and is supplied into the developing unit 12 through the connecting tube 240.

4. Function and Effect

In the image forming apparatus 1B according to the third embodiment, function and effect those similar to the first embodiment can be obtained with respect to the tandem type color printer instead of the monochromatic printer.

[Modification]

According to the first embodiment, the three conveying members 127 are provided in the toner container 117. However, numbers of the conveying members 127 is not limited to three, and one, two or not less than four conveying member(s) can be provided in the toner container 117.

Further, in the first embodiment, the shutter 131 is generally hollow cylindrical. However, a shutter having an arcuate shape is also available.

While the description has been made in detail with reference to the embodiment(s) thereof, it would be apparent to those skilled in the art that many modifications and variations may be made therein without departing from the spirit of the disclosure.

What is claimed is:

1. An image forming apparatus comprising:
a main casing;
a photosensitive drum;
a developing roller;
a scanner configured to expose the photosensitive drum to light; and
a toner container configured to accommodate toner therein, the toner container having an inlet opening to replenish toner to the toner container;
wherein the main casing includes:
a front wall; and a rear wall spaced apart from each other in a front-rear direction; and
a cover disposed between the front wall and the rear wall in the front-rear direction, a sheet formed with an image transferred from the photosensitive drum being discharged into the cover in a discharged direction, the discharged direction being defined from the rear wall to the front wall in the front-rear direction, and
wherein a distance from the front wall of the main casing to the inlet opening in the front-rear direction is smaller than a distance from the front wall of the main casing to the photosensitive drum in the front-rear direction.

2. The image forming apparatus according to claim 1, wherein the toner container includes a lid movable relative to the main casing between a closed position at which the lid closes the inlet opening and an open position at which the lid opens the inlet opening.

3. The image forming apparatus according to claim 2, wherein the lid is detachably attached to the inlet opening.

4. The image forming apparatus according to claim 2, wherein the inlet opening is configured to allow a toner replenishing vessel accommodating toner therein to be attached by a user in a case where the lid is at the open position.

5. The image forming apparatus according to claim 4, wherein the inlet opening is positioned above the developing roller in a state where the toner replenishing vessel is attached to the inlet opening.

6. The image forming apparatus according to claim 5, wherein the inlet opening is positioned above the photosensitive drum in a state where the toner replenishing vessel is attached to the inlet opening.

7. The image forming apparatus according to claim 1, further comprising:

a connecting tube configured to accommodate toner discharged from the toner container.

8. The image forming apparatus according to claim 7, wherein the connecting tube extends along the photosensitive drum.

9. The image forming apparatus according to claim 7, wherein the connecting tube includes an auger screw configured to convey the toner in the connecting tube.

10. The image forming apparatus according to claim 9, wherein the auger screw extends along the connecting tube.

11. The image forming apparatus according to claim 1, wherein the toner container has a communication opening through which toner in the toner container is discharged.

12. The image forming apparatus according to claim 11, further comprising:

a shutter movable between a first position at which the shutter closes the communication opening and a second position at which the shutter opens the communication opening.

13. An image forming apparatus comprising:

a main casing;

a photosensitive drum;

a developing roller;

a scanner configured to expose the photosensitive drum to light; and a toner container configured to accommodate toner therein, the toner container having an inlet opening to replenish toner to the toner container, wherein the main casing includes a front wall and a rear wall spaced apart from each other in a front-rear direction, wherein a distance from the front wall of the main casing to the inlet opening in the front-rear direction is smaller than a distance from the front wall of the main casing to the photosensitive drum in the front-rear direction, wherein the scanner comprises a front end and a rear end spaced apart from each other in the front-rear direction, and wherein, in a state where toner is replenished to the toner container through the inlet opening, a distance from the front wall of the main casing to the inlet opening in the front-rear direction is greater than a distance from the front wall of the main casing to the front end of the scanner in the front-rear direction.

14. The image forming apparatus according to claim 13, further comprising:

a connecting tube configured to accommodate the toner discharged from the toner container.

15. The image forming apparatus according to claim 14, wherein the connecting tube extends along the photosensitive drum.

16. The image forming apparatus according to claim 14, wherein the connecting tube includes an auger screw configured to convey the toner in the connecting tube.

17. The image forming apparatus according to claim 16, wherein the auger screw extends along the connecting tube.

18. The image forming apparatus according to claim 14, wherein the toner container is pivotally movable between a first position and a second position about the connecting tube;

wherein a position of the inlet opening when the toner container is at the second position is higher than a position of the inlet opening when the toner container is at the first position; and wherein toner is replenished to the toner container through the inlet opening in a state where the toner container is at the second position.

19. The image forming apparatus according to claim 14, wherein the connecting tube has a hollow cylindrical shape.

20. The image forming apparatus according to claim 18, further comprising:

a shutter provided in the toner container, wherein the connecting tube has an inlet opening for allowing toner from the toner container to pass therethrough, and wherein the shutter opens the inlet opening of the connecting tube when the toner container is positioned at the first position and the shutter closes the inlet opening of the connecting tube when the toner container is positioned at the second position.

21. The image forming apparatus according to claim 13, further comprising:

a lid configured to close the inlet opening of the toner container.

22. An image forming apparatus comprising:

a main casing;

a photosensitive drum;

a developing roller;

a scanner configured to expose the photosensitive drum to light; and a toner container configured to accommodate toner therein, the toner container having an inlet opening to replenish toner to the toner container;

wherein the main casing includes a front wall and a rear wall spaced apart from each other in a front-rear direction, wherein a distance from the front wall of the main casing to the inlet opening in the front-rear direction is smaller than a distance from the front wall of the main casing to the photosensitive drum in the front-rear direction, wherein the toner container is movable together with the inlet opening relative to the main casing between a first position and a second position, wherein the toner container is at the first position during an image forming operation, and wherein toner is replenished by a user to the toner container through the inlet opening in a state where the toner container is at the second position, and wherein a position of the inlet opening when the toner container is at the second position is higher than a position of the inlet opening when the toner container is at the first position.

* * * * *